United States Patent
Dietz et al.

(10) Patent No.: US 9,922,092 B2
(45) Date of Patent: Mar. 20, 2018

(54) DEVICES, SYSTEMS, AND METHODS FOR CONTEXT MANAGEMENT

(71) Applicant: CANON KABUSHIKI KAISHA, Tokyo (JP)

(72) Inventors: Quentin Dietz, Irvine, CA (US); Jeremy Serfling, Newport Beach, CA (US); Edward Smith, Santa Clara, CA (US); Ahmad Abiri, Irvine, CA (US); Kazuyuki Saito, Irvine, CA (US); Craig Mazzagatte, Aliso Viejo, CA (US); Dariusz T. Dusberger, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 394 days.

(21) Appl. No.: 14/260,813

(22) Filed: Apr. 24, 2014

(65) Prior Publication Data

US 2015/0310072 A1   Oct. 29, 2015

(51) Int. Cl.
G06F 17/30   (2006.01)

(52) U.S. Cl.
CPC .. *G06F 17/30528* (2013.01); *G06F 17/30312* (2013.01)

(58) Field of Classification Search
None
See application file for complete search history.

(56) References Cited

U.S. PATENT DOCUMENTS

| | | | |
|---|---|---|---|
| 8,286,085 B1 | 10/2012 | Denise | |
| 2007/0266095 A1 | 11/2007 | Billsus | |
| 2008/0209339 A1* | 8/2008 | MacAdaan | G06F 3/0482 715/745 |
| 2008/0244092 A1 | 10/2008 | Kosaka | |
| 2009/0125510 A1* | 5/2009 | Graham | G06F 17/30035 |
| 2011/0040768 A1 | 2/2011 | Shon | |

(Continued)

FOREIGN PATENT DOCUMENTS

| | | |
|---|---|---|
| JP | 2007-305135 A | 11/2007 |
| JP | 2008-257346 A | 10/2008 |
| WO | 2014010082 A1 | 1/2014 |

OTHER PUBLICATIONS

J. Schwan, "Enterprise Contextual Computing: From Google Now to Enterprise Now!", Built in Chicago, Feb. 25, 2013, downloaded from http://www.builtinchicago.org/blog/enterprise-contextual-computing-google-now-enterprise-now.

(Continued)

*Primary Examiner* — Amresh Singh
(74) *Attorney, Agent, or Firm* — Canon U.S.A., Inc. IP Division

(57) ABSTRACT

Systems, devices, and methods for contextual management extract context information and content information from a collection of stored digital content items; generate an index of the extracted context information and content information; store the indexed context information and content information; receive a query from a computing device, wherein the query is associated with a user; determine a context of the user; determine a context of a user activity; determine contents of the query; generate a recommendation in response to the query based on the context of the user, the context of the user activity, and the contents of the query; and return the recommendation to the computing device.

21 Claims, 20 Drawing Sheets

(56) References Cited

U.S. PATENT DOCUMENTS

| | | | |
|---|---|---|---|
| 2011/0179025 A1 | 7/2011 | Chuang | |
| 2011/0258204 A1 | 10/2011 | Hubbard | |
| 2011/0302152 A1 | 12/2011 | Boyd | |
| 2012/0036080 A1* | 2/2012 | Singer | G06Q 10/10 705/319 |
| 2012/0095979 A1 | 4/2012 | Aftab | |
| 2012/0323976 A1 | 12/2012 | Stidworthy | |
| 2013/0036117 A1 | 2/2013 | Fisher | |
| 2013/0060772 A1 | 3/2013 | Clark | |
| 2013/0066887 A1 | 3/2013 | Downs | |
| 2013/0086101 A1 | 4/2013 | Heidasch | |
| 2013/0091138 A1 | 4/2013 | Liensberger | |
| 2013/0103389 A1 | 4/2013 | Gattani | |
| 2013/0103681 A1 | 4/2013 | Renders | |
| 2013/0103699 A1 | 4/2013 | Perantatos | |
| 2013/0103796 A1 | 4/2013 | Fisher | |
| 2014/0032562 A1* | 1/2014 | Arngren | G06F 17/3002 707/741 |
| 2015/0213043 A1 | 7/2015 | Ishii | |

OTHER PUBLICATIONS

Autonomy Corp., "Autonomy iManage, Tthe Leader in Intelligent Information Management Solutions for Law Firms," 2008.
Autonomy Corp., "Autonomy iManage WorkSite Server and Software Development Kit," 2009.
Autonomy Corp., "Autonomy iManage WorkSite," 2009.
Shinji Morishita et al., Application of Bitmap Scan to the Context Index in Lifelog, Multimedia, Distributed, Cooperative and Mobile Symposium series, vol. 2009, No. 1, pp. 156-161, Jul. 2009.

* cited by examiner

| Keywords |
|---|
| "Component diagram": text-analysis service 1: Keyword -------> weight: 1<br>"CZL-09": subject: abbreviation -------> weight: 1<br>"CZL": Enterprise Dictionary -------> weight: 1<br>"update": subject: name -------> weight: 0.8<br>"release": subject: name -------> weight: 0.8<br>"sequence diagram": text-analysis service 1: Keyword -------> weight: 0.68<br>"design document": text-analysis service 2: Keyword -------> weight: 0.22<br>"crawler": text-analysis service 2: Keyword -------> weight: 0.09<br>"shared folder": text-analysis service 1: Keyword -------> weight: 0.06 |

FIG. 4A

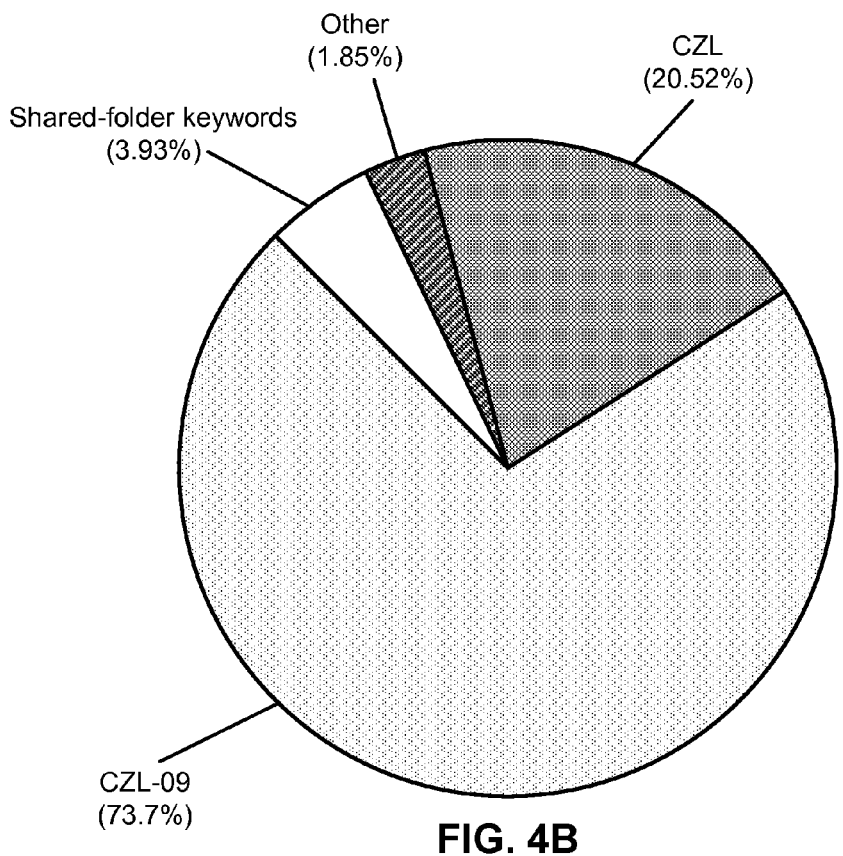

FIG. 4B

Context Profile for User ABC

| Job Information |
| --- |
| Job Title: Engineering Manager |
| Department: Research and Development |
| Division: Western States |
| Projects: ISSXZ Development, AL-189 Design, QZ-L7 Concept |

| Applications |
| --- |
| Email client |
| CAD Software |
| Word-Processing Application |
| VHDL editor |

| Recently-Accessed Files |
| --- |
| ISSXZ Management Plan |
| Western States Project Guide |
| QZ-L7 High-Level Review |
| QZ-L7 Timelines and Objectives |
| R&D Employee Assignments |

FIG. 19A

Context Profile for User ABC

| Job Information |
| --- |
| Job Title: Engineering Manager |
| Department: Research and Development |
| Division: Western States |
| Projects: ISSXZ Development, AL-189 Design, QZ-L7 Concept |

| Applications |
| --- |
| Email client |
| CAD Software |
| VHDL editor |
| Video-Playing Application |

| Recently-Accessed Files |
| --- |
| AL-189 Flux Capacitor Video |
| ISSXZ Management Plan |
| Western States Project Guide |
| QZ-L7 High-Level Review |
| QZ-L7 Timelines and Objectives |
| R&D Employee Assignments |

FIG. 19B

Context Profile for Document XYZ

| User Information | |
|---|---|
| Author: | John |
| Contributors: | Lynn, Bill, Alice |
| Reviewers: | Travis, Kyle |

| Usage Information | |
|---|---|
| Created: | January 2, 2013 |
| Last modified: | February 23, 2013 |
| Last viewed: | March 2, 2013 |

| General Information | |
|---|---|
| Type of file: | Text Document |
| Size of file: | 1.3MB |
| Project: | Project QZX |

| Information About the Content | |
|---|---|
| Keywords: | QZX, marketing, television, discount, holiday, projections |
| Tags: | New plan, holiday marketing, QZX |

FIG. 20A

Context Profile for Image 987

| User Information | |
|---|---|
| Author: | Larissa |
| Editors: | Cassie, Spencer |

| Usage Information | |
|---|---|
| Created: | September 9, 2013 |
| Last modified: | January 4, 2014 |
| Last viewed: | January 6, 2014 |

| General Information | |
|---|---|
| Type of file: | JPEG image |
| Size of file: | 10.6MB |
| Album: | Traveling |
| Lens: | 70-200mm, f/2.8 |

| Content Information | |
|---|---|
| People: | Tom, Stephanie, Brent, Andrea |
| Tags: | Rome, building, artwork |

FIG. 20B

DEVICES, SYSTEMS, AND METHODS FOR CONTEXT MANAGEMENT

BACKGROUND

Technical Field

This description generally relates to context management.

Background

The users in an organization may each store thousands of digital documents, emails, videos, pictures, and other electronic files, and each user's files may not be accessible to other users, even if those users are working on related projects. Additionally, the files may not be adequately described, labeled, or tagged. Furthermore, each user may use a personal scheme to organize his files, which leads to inconsistent schemes within an organization.

SUMMARY

In one embodiment, a method for contextual management comprises extracting context information and content information from a collection of stored digital content items; generating an index of the extracted context information and content information; storing the indexed context information and content information; receiving a query from a computing device, wherein the query is associated with a user; determining a context of the user; determining a context of a user activity; determining contents of the query; generating a recommendation in response to the query based on the context of the user, the context of the user activity, and the contents of the query; and returning the recommendation to the computing device.

In one embodiment, a system for contextual management comprises one or more computer-readable media; one or more input/output interfaces; and one or more processors that are configured to cause the system to retrieve content information from a first application that is operating on a computing device, retrieve context information from the first application, retrieve metadata related to a user that is associated with the computing device, retrieve context information from other second applications on the computing device, send a query to a searching device, wherein the query includes the content information from the first application, the context information from the first application, the metadata related to the user, and the context information from the other second applications, extract relevant contents from the content information, send the relevant contents, the context information from the first application, the metadata related to the user, and the context information from the other second applications to a recommendation service, at the recommendation service, generate a recommendation based on the relevant contents, the context information from the first application, the metadata related to the user, and the context information from the other second applications, wherein the recommendation indicates one or more of a storage location and a digital file, and send the recommendation to the computing device.

In one embodiment, one or more computer-readable media store instructions that, when executed by one or more computing devices, cause the one or more computing devices to perform operations comprising extracting context information and content information from a collection of content items; generating an index of the extracted context information and content information; storing the indexed context information and content information; receiving a query from computing device, wherein the query is associated with a user; determining a context of the user; determining a context of a user activity; determining contents of the query; generating a recommendation in response to the query based on the context of the user, the context of the user activity, and the contents of the query; and returning the recommendation to the computing device.

BRIEF DESCRIPTION OF THE DRAWINGS

FIG. 4A and FIG. 4B illustrate example embodiments of context-management user interfaces.

FIG. 19A and FIG. 19B illustrate example embodiments of context profiles of a user.

FIG. 20A and FIG. 20B illustrate example embodiments of context profiles of content items.

DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
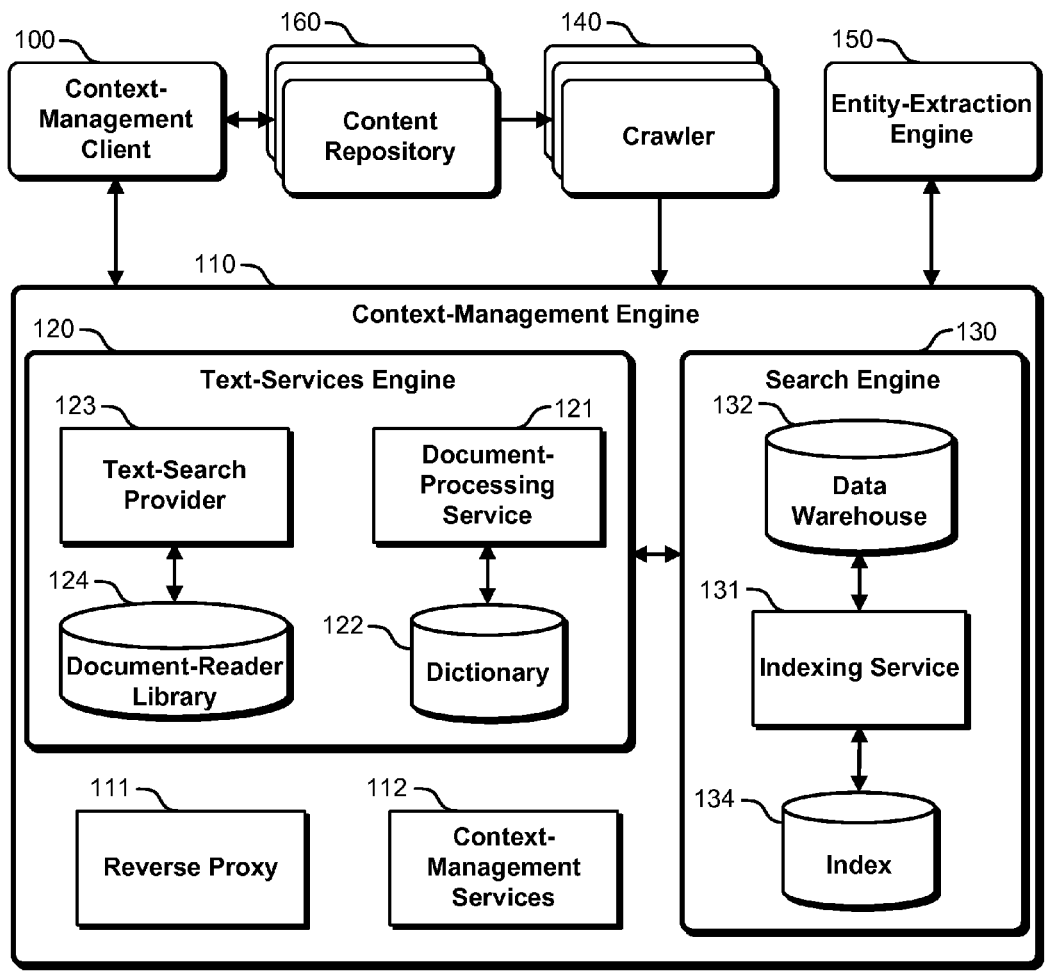
FIG. 1 illustrates an example embodiment of a context-management system.

FIG. 1 illustrates an example embodiment of a context-management system. The context-management system includes a context-management client ("CXM client") 100, a context-management engine ("CXM engine") 110, a text-services engine 120, a search engine 130, one or more crawlers 140, an entity-extraction engine 150, and one or more content repositories 160. The CXM client 100, the CXM engine 110, the text-services engine 120, the search engine 130, the one or more crawlers 140, the entity-extraction engine 150, and the one or more content repositories 160 include logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. Also, the CXM client 100, the CXM engine 110, the text-services engine 120, the search engine 130, the one or more crawlers 140, the entity-extraction engine 150, and the one or more content repositories 160 may each be implemented in one or more respective applications and in one or more instances of the respective applications. For example, the CXM client 100 may be implemented by one or two instances of a context-management-client application. Also for example, the CXM client 100 may be implemented by one instance of each of two applications.

Additionally, at least some of the instances of the CXM client 100, the CXM engine 110, the text-services engine 120, the search engine 130, the one or more crawlers 140, the entity-extraction engine 150, and the one or more content repositories 160 may operate on the same computing device (e.g., a desktop, a laptop, a tablet PC, a smartphone, a server, a personal digital assistant) or the same set of computing devices (e.g., in a distributed computing environment, such as a cloud computing environment), or they may all operate on different devices. A content repository 160 may include, for example, one or more of the following: a content-management service (either local or remote), a network drive, a shared folder, and a file server. Also, a content repository 160 can be located in the same enterprise or local network as the CXM engine 110, or the content repository 160 can be located on the World Wide Web. The CXM client 100 interfaces with the CXM engine 110 to generate content recommendations for a user. In operation, the CXM client 100 sends a query to the CXM engine 110, which then generates and returns recommendations. Recommendations can identify digital content items (e.g., documents, emails, photos, sound files, videos) that are stored in one or more content repositories 160 and can identify storage locations (e.g., folders) in the one or more repositories 160. The CXM client 100 may query the content repository 160 that stores identified or referenced content items in order to obtain the content items. The recommendations may be generated based on one or more of the following: a context of the user's activity in a first application, a context of the user's activity in other applications, a context of the user, one or more content items in the first application, one or more content items in the other applications, and the context of any content items.

Also, the CXM engine 110 may filter the recommendations based on access permissions. For example, the CXM engine 110 may determine the access permissions of a query and the respective access permissions of content items, and the CXM engine 110 may filter out recommendations for content items that are not within the scope of the access permissions of the query. Thus, the CXM engine 110 may remove confidential content items from the recommendations. Also for example, the determination of the access permissions of a query may be based on one or more of the following: the access permissions of a user that is associated with a query, a check of a permissions reference, and a permission level of a user activity that is associated with the query.

Context includes the circumstances or behaviors that form the setting for a user activity or that form the setting for a content item. For example, context information for a user activity may include short-term context information, such as a user's current or recent activities (e.g., searches, recent meetings, recently-written documents, recently-accessed documents, currently-open documents, a current meeting, recent emails, recent collaborations, operating applications, a time of the activity) and may include long-term context information, such as previous projects that the user has worked on, skills of the user, interests of the user, past activities of the user, and access privileges of the user. Also for example, the context information of a content item may include, for example, author, contributors, reviewers, type of the content item, reader comments, project classification, storage location, version history, change history, viewing statistics, reader ratings, and other metadata about the content item.

Additionally, the system can perform context derivation to generate additional context information (e.g., for a content item, a user, or an activity) that is based on related context information. For example, the system can perform context derivation to generate additional context information for a user, where the additional context information includes the context information of another user who directly communicates with the user or shares common elements (e.g., content items) with the user's context. For example, user X is new to the system or company and has a limited context profile, or limited content is related to user X. If user X communicates with (e.g., sends or receives emails from) user Y, then the context profile of user Y or the content that is related to user Y may be used to generate a context profile for user X.

In this embodiment, the CXM engine 110 includes a text-services engine 120, a reverse proxy 111, context-management services 112, and a search engine 130. The CXM engine 110 manages communications between the CXM client 100 and the search engine 130, for example by acting as a front-end for communications with the CXM client 100. Additionally, in some embodiments, the CXM engine 110 exposes a document-reader library 124 to the CXM client 100 as a web service or maintains a collection of keywords, which are stored as one or more searchable dictionaries 122. In some embodiments, the CXM engine 110 is an internet-information-services-hosted (IIS-hosted) web service. Also, the CXM engine 110 may use security services, such as IIS URL Rewrite and Application Request Routing (ARR) services, to provide security for various services, and the communications between the CXM client 100 and the CXM engine 110 may be encrypted and authenticated.

The reverse proxy 111 redirects communications to various endpoints in the system (e.g., by means of an IIS-URL-Rewrite module). For example, in some embodiments, outgoing connections from the CXM engine 110 (including responses that are generated by other components of the system and that are routed through the reverse proxy 111) are monitored for HTML and CSS files. If one of these file types is detected, the relative URLs within the file are modified (e.g., according to a set of rules) so that future connections are also routed through the reverse proxy 111.

Figure 2:
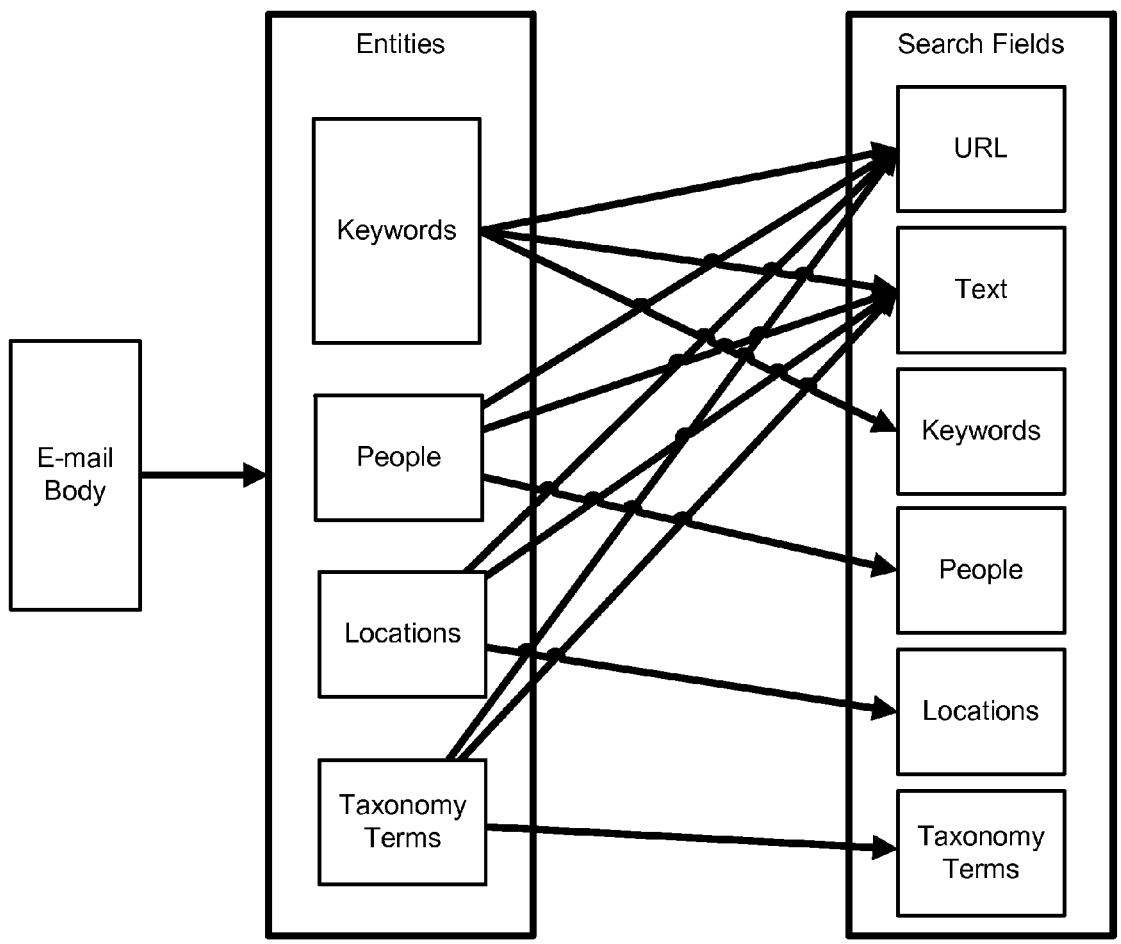
FIG. 2 illustrates an example embodiment of an input email that is received by an indexing service.

The search engine 130 includes an indexing service 131, a data warehouse 132, and an index 134. The search engine 130 accepts queries (e.g., from the CXM client 100) and responds with one or more recommendations. The search engine 130 initiates searches of one or more of the content repositories 160, and a content repository 160 may be local to the computing device that operates the CXM client 100 or may be a remote repository. The search engine 130 searches for and ranks recommendations (e.g., digital content items, storage locations) based on data stored in the data warehouse 132. If more than one type of metadata is used, the search engine 130 may weight each type of metadata when searching for and ranking content items. For example, FIG. 2 illustrates an example embodiment of an input email that is received by the search engine 130. After the email is received, the entities in the email are extracted and then mapped to search fields. An entity may be mapped to more than one search field. For example, the entity "people" may be mapped to the following search fields: "URL", "Text", and "People". Also, respective weights may be assigned to the search field. For example, a Solr query may be generated that weights each of the entities (e.g., keywords, people) that are associated with the email. Also, the search engine 130 can use other techniques. For example, when an attachment is present in an email and relevant documents that match the attachment need to be ranked in Solr, the search engine 130 may use the MoreLikeThis handler of Solr. In some embodiments, the interesting-terms component of Solr, which is based on a term frequency-inverse document frequency (TF-IDF) measure, is used to extract the important keywords in the input attachment, and the important keywords are then used to rank the returned documents in Solr. Also, attachments are content items that have been attached to an email, and attachments may be any type of content that can be attached to an email.

Referring again to FIG. 1, the indexing service 131 also generates index data and stores the index data in the index 134. For example, the indexing service 131 may generate index data for the contents of the data warehouse 132 and the one or more content repositories 160, and the generated index data can be used by the search engine 130 to expedite searches. The indexing service 131 may continually operate one or more processes that search and index the data in the data warehouse 132.

The text-services engine 120 includes a text-search provider 123, a document-reader library 124, a document-processing service 121, and a dictionary 122. The text-search provider 123 may be a wrapper for the document-reader library 124 and may use a highly multithreaded approach to search for a series of keywords in a content item (e.g., document, email) and return any keywords that are found in the given content item. For example, the search can be based on fuzzy search criteria and thresholds. The text-services engine 120 may provide a web interface for the text-search provider 123.

Also, the document-processing service 121 supports the creation and search (e.g., through a web interface) of multiple dictionaries 122, and the document-processing service 121 extracts text data from the content items that were found by the crawler 140 and stores the text data, and any accompanying metadata, in the dictionary 122 or the data warehouse 132. Thus, the document-processing service 121 may normalize the data that is extracted from the content items and may normalize the metadata before sending any data or metadata to the data warehouse 132. Accordingly, the data warehouse 132 may store normalized data and metadata that were derived from the content items that were found by the crawler 140, and thus the data warehouse 132 may duplicate, or approximately duplicate, the content items that are stored in the data repositories 160. Furthermore, the dictionary 122 may sort the keywords or store the keywords in a prioritized order, thereby keeping the most commonly used keywords on the top. For example, when the document-processing service 121 adds a new keyword to the dictionary 122, the document-processing service 121 may re-evaluate, re-score, and re-sort each keyword in the dictionary 122, such that the keywords that are most commonly used (e.g., accounting for recent trends) are kept on the "top" of the dictionary 122. In some embodiments, only the top n keywords in the dictionary 122 are used (e.g., fed into a Document Library API) during a search operation, which may help prevent performance from being compromised when the dictionary 122 stores a very large number of entries. The document-processing service 121 may also perform all synchronization operations of any dictionaries 122, which may be required by multithreaded services.

The CXM engine 110 also includes context-management services 112. In some embodiments, the context-management services 112 perform two general functions: act as an intermediary between an indexing service (e.g., the indexing service 131) and a client (e.g., the CXM client 100), and also act as a client in some situations. For example, in some embodiments, when the CXM engine 110 receives a query from the CXM client 100, the context-management services 112 construct a modified query (e.g., a Solr query) or an enhanced query from the information that is contained the query, from the accumulated context (e.g., context profiles), or both. Thus, in this example, the context-management services 112 may construct a modified query by injecting or reweighting terms based on the accumulated context (e.g., all of the relevant context profiles) and on the information that is included in the query. Additionally, the context-management services 112 may provide a simple API that a CXM client 100 can use to obtain content items that are relevant to the query, and the context-management services 112 may include the context terms that are relevant to the query with the query response. The context-management services 112 may also provide the relevancy score of each returned content item.

Additionally, the context-management services 112 may build and maintain a context profile for a user or for a certain activity. For example, the CXM client 100 may send a user identifier (or a user-activity identifier) and associated context information to the context-management services 112. The context information may include, for example, applications that are currently operating on the computing device that operates the CXM client 100, content items that the user has recently accessed, a job title of the user, a workgroup of the user, and access privileges of the user. The context-management services 112 may then generate or update a context profile of the user. The context profile may be stored in the data warehouse 132. The CXM client 100 may send the user identifier and associated context information according to a predetermined frequency (e.g., every minute, every ten minutes, every hour) or when the CXM client 100 detects changes to the context information of the user (e.g., a document is opened, an application is closed). Also, the CXM client 100 may send recommendation-usage information (e.g., information that indicates whether a user selected a given recommendation) to the context-management services 112.

The one or more crawlers 140 crawl one or more content repositories 160, collect metadata about the content items, and send the metadata and the content items to the document-processing service 121, which later sends the content items and the metadata to the data warehouse 132. A crawler 140 may include multiple types of crawler services that are each designed to communicate with a specific type of content repository 160 (e.g., content-management services, shared folders, network drives). A crawler 140 can also have multiple instances of each type of crawler service and can be configured to simultaneously crawl multiple content repositories 160.

In order to improve the overall performance of the system, a crawler 140 may cache a small amount of information about the content items that it has crawled. This information may be used in subsequent crawls (e.g., a crawl after the first full crawl) to detect modified files or updated files, such that extensive processing (e.g., metadata retrieval, data-warehouse upload) is not performed for files that have not been modified. Furthermore, a crawler 140 may also detect deleted content items and notify the indexing service 131 or the data warehouse 132 of the deletions. This may ensure that the corresponding entries are removed from the data warehouse 132. Moreover, a crawler 140 may self-host a web-based management interface to allow a user to add or delete content repositories 160 from the service of the crawler 140. Also, the crawler 140 may search recently-accessed content items on a computing device. For example, some operating systems maintain a list of links to recently-accessed content items, and the crawler 140 may use the list of links to search for the new or updated content items.

Figure 3:
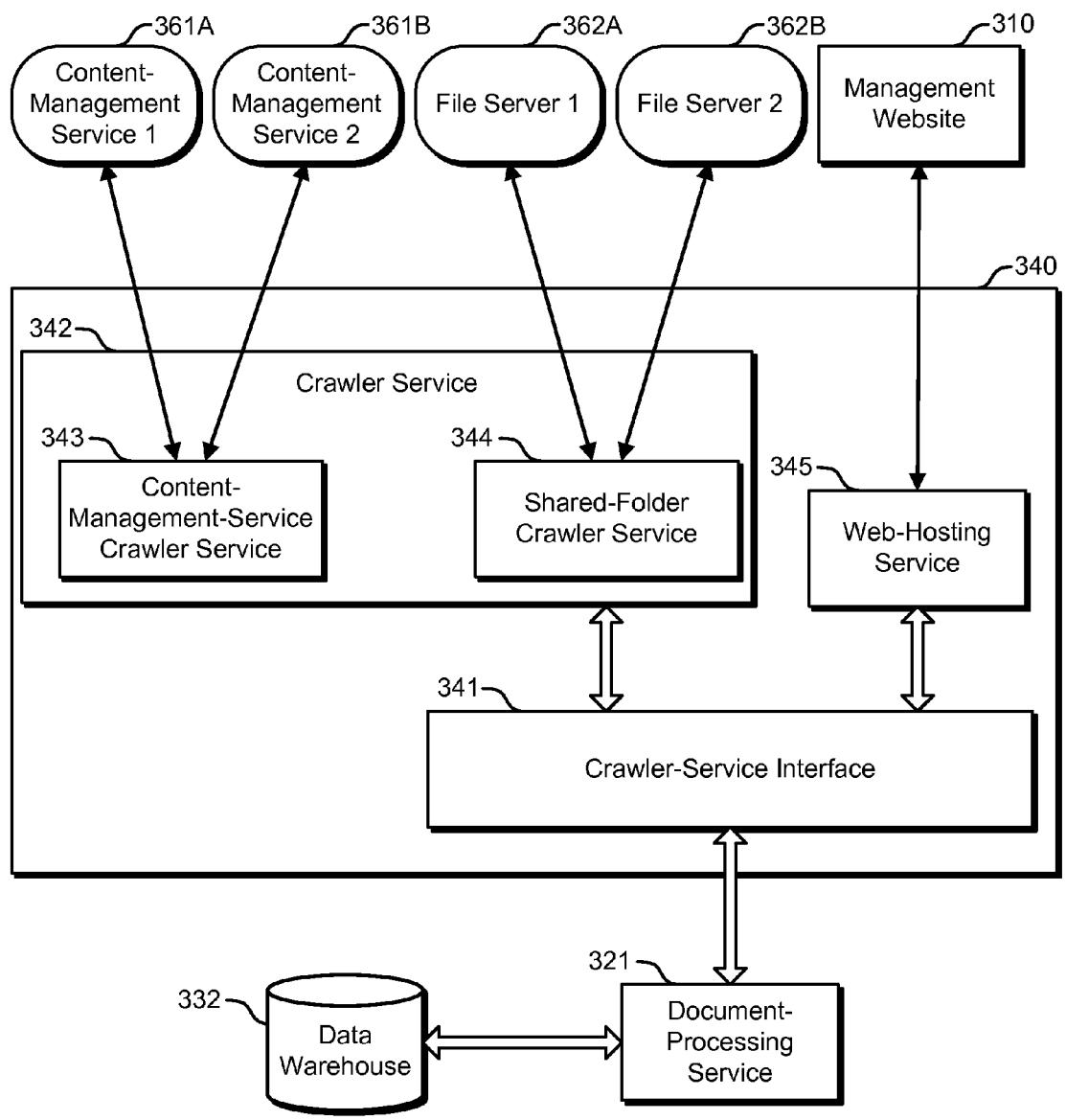
FIG. 3 illustrates an example embodiment of a crawler.

FIG. 3 illustrates an example embodiment of a crawler 340. The crawler 340 includes a crawler-service interface 341, a crawler service 342, a content-management-service crawler service 343, a shared-folder crawler service 344, and a web-hosting service 345. The crawler service 342 can be configured to target certain types (e.g., documents, images, photos, videos, audio recordings) of content. A crawler service 342 may have at least two primary modes of operation. One mode uses a Client Object Model to communicate with content repositories (e.g., a first content-management service 361A, a second content-management service 361B). Functions that are performed in this mode of operation include obtaining lists of content items, metadata, and security information. However, this mode of operation may have some performance drawbacks: the Client Object Model may require a noticeable amount of time to fetch a list of content items, which may prevent the crawler 340 from being able to frequently send updates to a data warehouse 332 and which may also create a significant network load on the system. The second mode of operation may solve this problem by using a REST interface. By obtaining lists of content items, the content items, and basic metadata (e.g., the LastModifiedDate) through the REST interface, the crawler service 342 may be able to identify modified content items in a fraction of the time that is required when using the Client Object Model. In some embodiments, only new content items or modified content items are processed further using the Client Object Model. Additionally, some embodiments allow the "UseRESTServices" property of the crawler service 342 to be modified by means of a crawler-services web interface that is provided by the web-hosting service 345 and that is accessed by means of a management website 310.

After a content repository (e.g., a first content-management service 361A, a second content-management service 361B, a first file server 362A, and a second file server 362B) has been crawled, the crawler 340 may send a list of any new content items that were found, along with any accompanying metadata or the content items, to a document-processing service 321.

Referring again to FIG. 1, the entity-extraction engine 150 performs entity extraction and analyzes content items, and a content item may include structured or unstructured data. For example, the entity-extraction engine 150 may automatically extract taxonomy terms, people, locations, and keywords from a document or another content item. Additionally, the entity-extraction engine 150 may create a summary of a collection of content. In some embodiments, the entity-extraction engine 150 creates summaries for all content items in a collection of content (e.g., content items that are received in a request) and extracts metadata from the content items in a collection of content.

Also, the CXM client 100 may generate an interface that allows a user to send queries, view a list of the content items that are returned by the CXM engine 110, view a breakdown of the scores of the results, and view the content items. FIG. 4A and FIG. 4B illustrate example embodiments of context-management user interfaces. The user interface of FIG. 4A displays keywords that were extracted from an email. The keywords are displayed with their respective weights and their respective sources. For example, the keyword "CZL" was provided by an enterprise dictionary (which is an example of the dictionary 122) and was assigned a weight of 1. Also for example, the keyword "sequence diagram" was provided by text-analysis service 1 and was assigned a weight of 0.68. The user interface of FIG. 4B displays the respective significance of keywords in the results. For example, the keyword "CZL-09" was found in 73.7% of the search results.

Referring again to FIG. 1, the CXM client 100 may also obtain the listed content items from the respective content repositories 160 that store the content items. For example, the CXM client 100 may automatically begin to retrieve all of the listed content items or part of the listed content items (e.g., the top x results) in response to receiving a list of content items from the CXM engine 110. Also, the CXM client 100 may retrieve some or all listed content items in response to a received user command.

Figure 5:
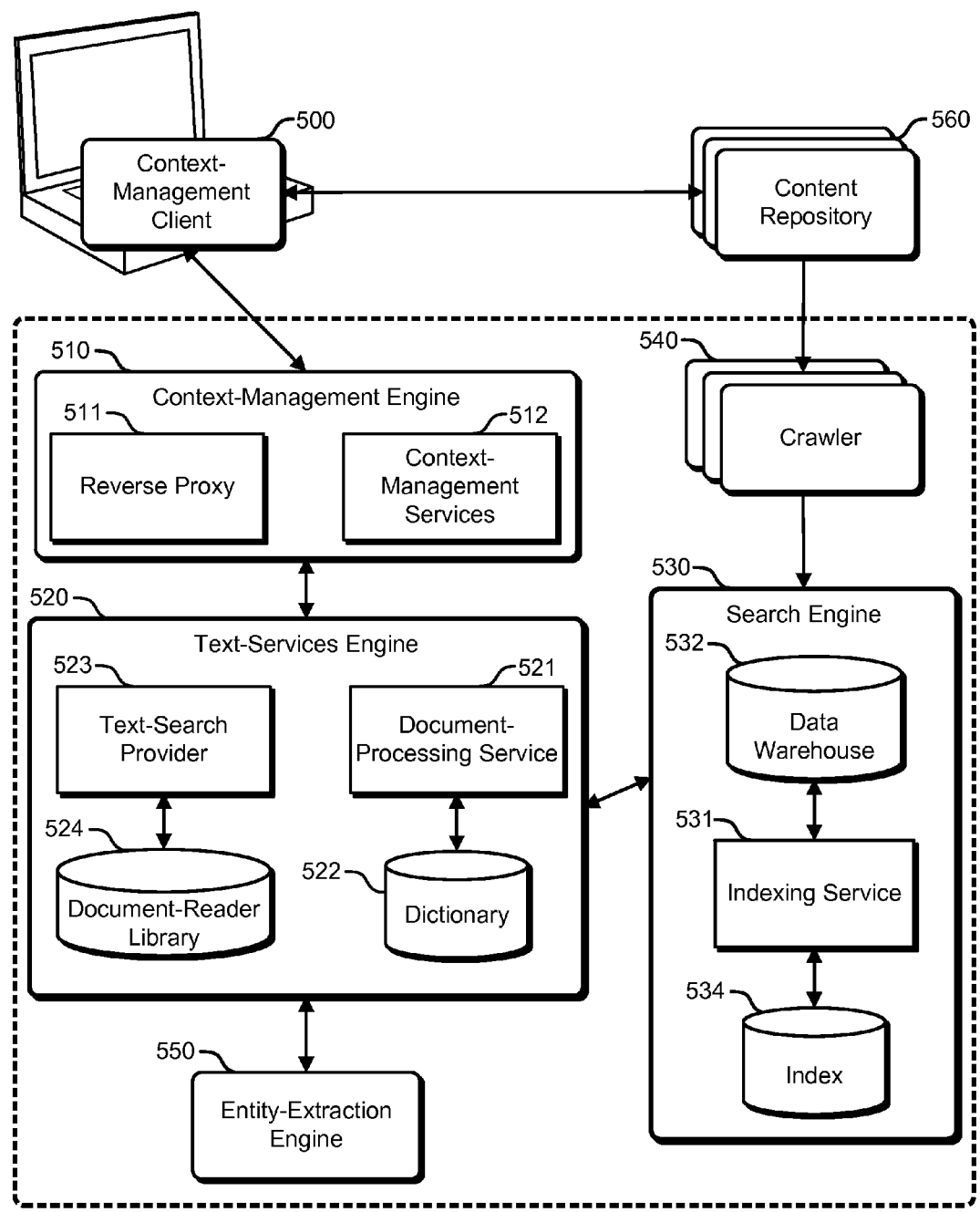
FIG. 5 illustrates an example embodiment of a context-management system.

FIG. 5 illustrates an example embodiment of a context-management system. This embodiment includes a CXM client 500, a CXM engine 510, a text-services engine 520, a search engine 530, one or more crawlers 540, an entity-extraction engine 550, and one or more content repositories 560. In this embodiment, the CXM engine 510 does not include the text-services engine 520 and the search engine 530. However, in some embodiments, as shown by the dashed line, the CXM engine 510 includes the text-services engine 520, the search engine 530, the one or more crawlers 540, and the entity-extraction engine 550.

Figure 6:
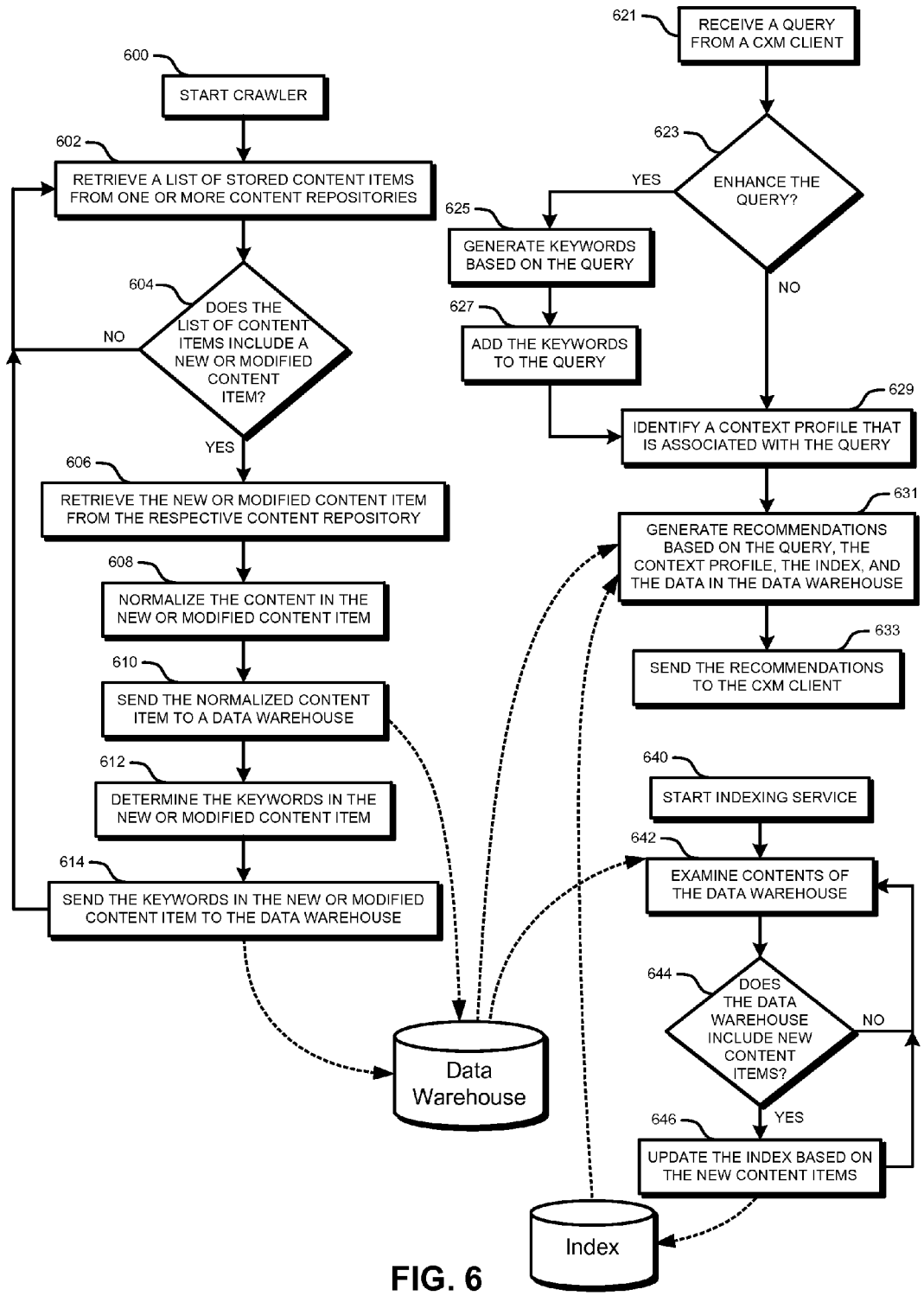
FIG. 6 illustrates example embodiments of operational flows in a context-management system.

FIG. 6 illustrates example embodiments of operational flows in a context-management system. Although this operational flow and the other operational flows described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of these operational flows and the other operational flows that are described herein may omit blocks, add blocks, change the order of the blocks, combine blocks, or divide blocks into more blocks.

A first flow starts in block 600, where a crawler is started. The first flow then moves to block 602, where the crawler retrieves a respective list of stored content items from one or more content repositories. Next, in block 604, the crawler determines if any list of content items includes a new or modified content item. If not (block 604=NO), then the first flow returns to block 602. If yes (block 604=YES), then the first flow proceeds to block 606, where the new or modified content item is retrieved from the respective content repository. Then in block 608, the content in the new or modified content item is normalized. For example, the crawler may send the new or modified content item to a document-processing service, and the document-processing service may extract raw, unformatted text from the content item, thereby normalizing the content item to the form of raw, unformatted text.

Following, in block 610, the normalized content item is sent (e.g., by the document-processing service, by the crawler) to a data warehouse. Next, in block 612, the keywords (or other entities) in the new or modified content item are determined, for example by an entity-extraction engine. Then in block 614, the keywords in the new or modified content item are sent to the data warehouse, and the first flow then returns to block 602.

A second flow starts in block 621 (e.g., in response to a function call, an expiration of a timer, or an interrupt), where a query is received from a CXM client. The query may include an entire content item (e.g., a document, an image, a video, an email, and an audio file), a part of a content item, and context information about the content item. In block 621, a context of a user that is associated with the query may be determined (e.g., via obtained user context profiles), a context of a user activity that is associated with the query may be determined (e.g., via obtained activity context profiles), and the contents (e.g., the content of a content item) of the query may be determined. Determining the contents of the query may include disambiguating the query, for example determining if "jaguar" refers to an animal or an automobile and correcting misspelled text. The second flow then moves to block 623, where it is determined if the query will be enhanced. If not (block 623=NO), then the second flow proceeds to block 629. If yes (block 623=YES), then the second flow moves to block 625, where keywords are generated (e.g., identified by an entity-extraction engine) based on the query. Then in block 627, the keywords are added to the query or otherwise indicated in the query, and the second flow then moves to block 629.

In block 629, a context profile that is associated with the query is identified. For example, the query may include a user identifier, and the user identifier may be used to determine an associated context profile of the user.

In block 631, one or more recommendations are generated based on the query (which may or may not be enhanced), on the context profile of the user that is associated with the query, on the data in the index, and on the other data in the data warehouse. Finally, in block 633, the recommendations are sent to the CXM client.

A third flow starts in block 640, where an indexing service is started. Next, in block 642, the indexing service examines the content items that are stored by the data warehouse. The third flow then moves to block 644, where the indexing service determines if the data warehouse includes new or modified content items. If not (block 644=NO), then the third flow returns to block 642. If yes (block 644=YES), then the third flow proceeds to block 646, where the indexing service updates the index based on the new or modified content items, and then the third flow returns to block 642.

Figure 7:
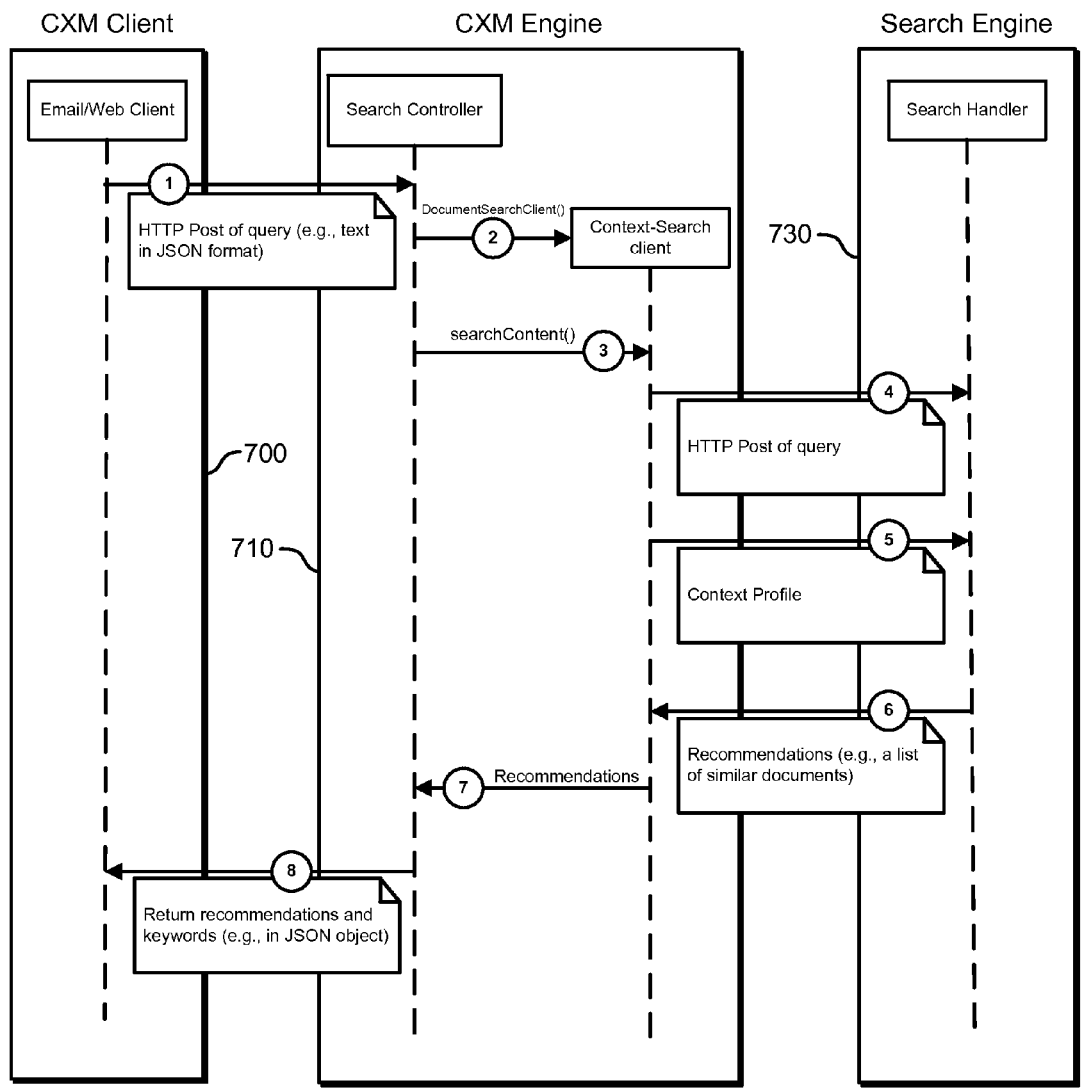
FIG. 7 illustrates an example embodiment of an operational flow in a context-management system.

FIG. 7 illustrates an example embodiment of an operational flow in a context-management system. In stage 1, an email/web client, which is operated by a CXM client 700, sends an HTTP Post of a query (e.g., text in a JSON format) to a search controller, which is operated by a CXM engine 710. In stage 2, the search controller starts a context-search client, and then in stage 3, the search controller sends the query to the context-search client. In stage 4, the context-search client sends an HTTP Post of the query to a search handler, which is operated by a search engine 730. In stage 5, the context-search client identifies a context profile that is associated with the query (e.g., associated with a user who is associated with the query, associated with a content item that is identified in the query, associated with an activity that is indicated in the query) and sends the context profile to the search engine 730. The search engine 730 then generates recommendations (e.g., a list of similar documents or other content items) based on the query and on the context profile, and, in stage 6, the search handler returns the recommendations to the context-search client. Following, in stage 7, the context-search client sends the recommendations to the search controller. And in stage 8, the search controller sends the recommendations and, in some embodiments, the keywords that were used to generate the recommendations (e.g., in a JSON object) to the email/web client.

Figure 8:
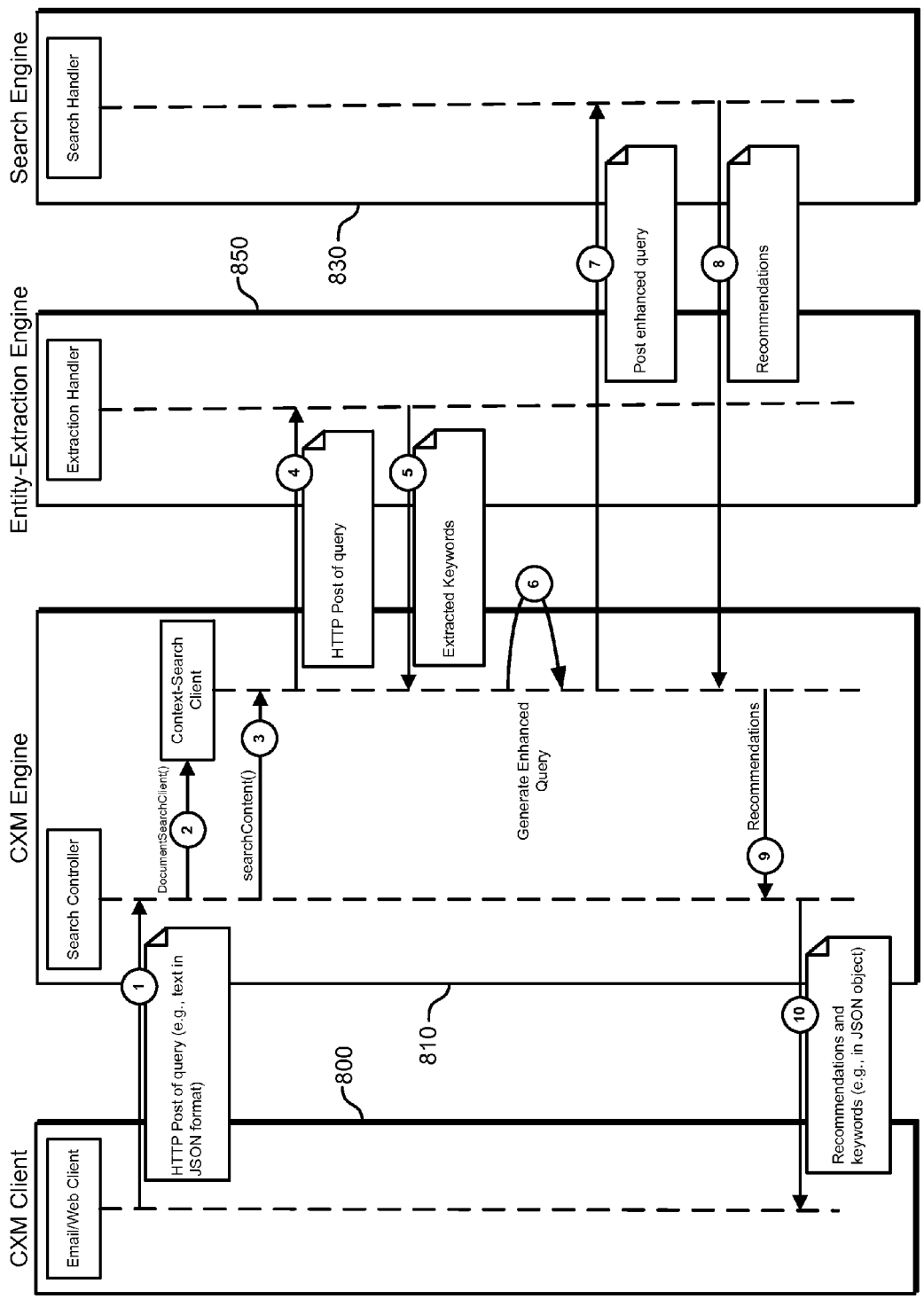
FIG. 8 illustrates an example embodiment of an operational flow in a context-management system.

FIG. 8 illustrates an example embodiment of an operational flow in a context-management system. In stage 1, an email/web client, which is operated by a CXM client 800, sends an HTTP Post of a query (e.g., text in a JSON format) to a search controller, which is operated by a CXM engine 810. In stage 2, the search controller calls a context-search client, and in stage 3, the search controller sends the query to the context-search client.

Following, in stage 4, the context-search client sends an HTTP Post that includes the query to an extraction handler that is operated by an entity-extraction engine 850. The entity-extraction engine 850 extracts keywords (or other entities) from the query, and, in stage 5, the extraction handler returns the extracted keywords (or other entities) to the context-search client. In stage 6, the context-search client generates an enhanced query, which includes at least some of the extracted keywords (or other entities) and the query. Then in stage 7, the context-search client sends a Post that includes the enhanced query to a search handler, which is operated by a search engine 830. Also, in stage 7 the context-search client may obtain a context profile that is associated with the query and send the context profile to the search handler. The search engine 830 generates recommendations based on the enhanced query and, if received, on the context profile. The search handler returns the recommendations to the context-search client in stage 8. The context-search client sends the recommendations to the search controller in stage 9, and, finally, in stage 10 the search controller sends the recommendations and, in some embodiments, the keywords (or other entities), to the email/web client (e.g., in a JSON object).

Figure 9:
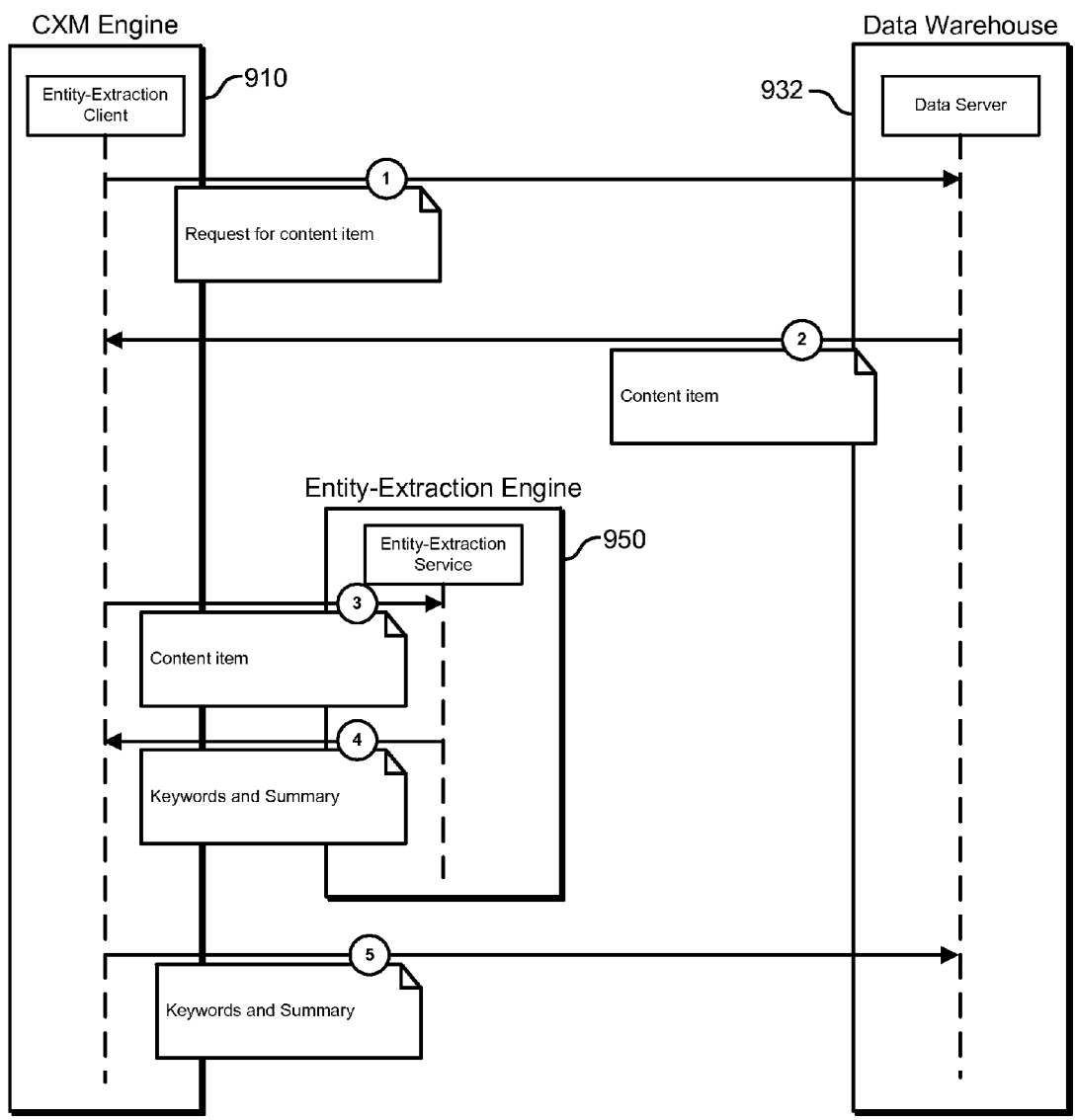
FIG. 9 illustrates an example embodiment of an operational flow in a context-management system.

FIG. 9 illustrates an example embodiment of an operational flow in a context-management system. In stage 1, an entity-extraction client that is operated by a CXM engine 910 sends a request for a content item to a data server that is operated by a data warehouse 932. The data warehouse 932 may store an unformatted version (e.g., raw, unformatted text) of the content items that are found on a data repository. In stage 2, the data server sends the requested content item to the entity-extraction client. Next, in stage 3, the entity-extraction client sends the content item to an entity-extraction service that is operated by an entity-extraction engine 950. The entity-extraction engine 950 generates keywords (or other entities) and, in some embodiments, a summary of the content item, based on the received content item. Then, in stage 4, the entity-extraction service sends the keywords (and the summary, in some embodiments) to the entity-extraction client. Finally, in stage 5 the entity-extraction client sends the keywords (and any summaries) to the data server, which stores the keywords (and any summaries) in association with the content item that was used to generate the keywords (and any summaries).

Figure 10:
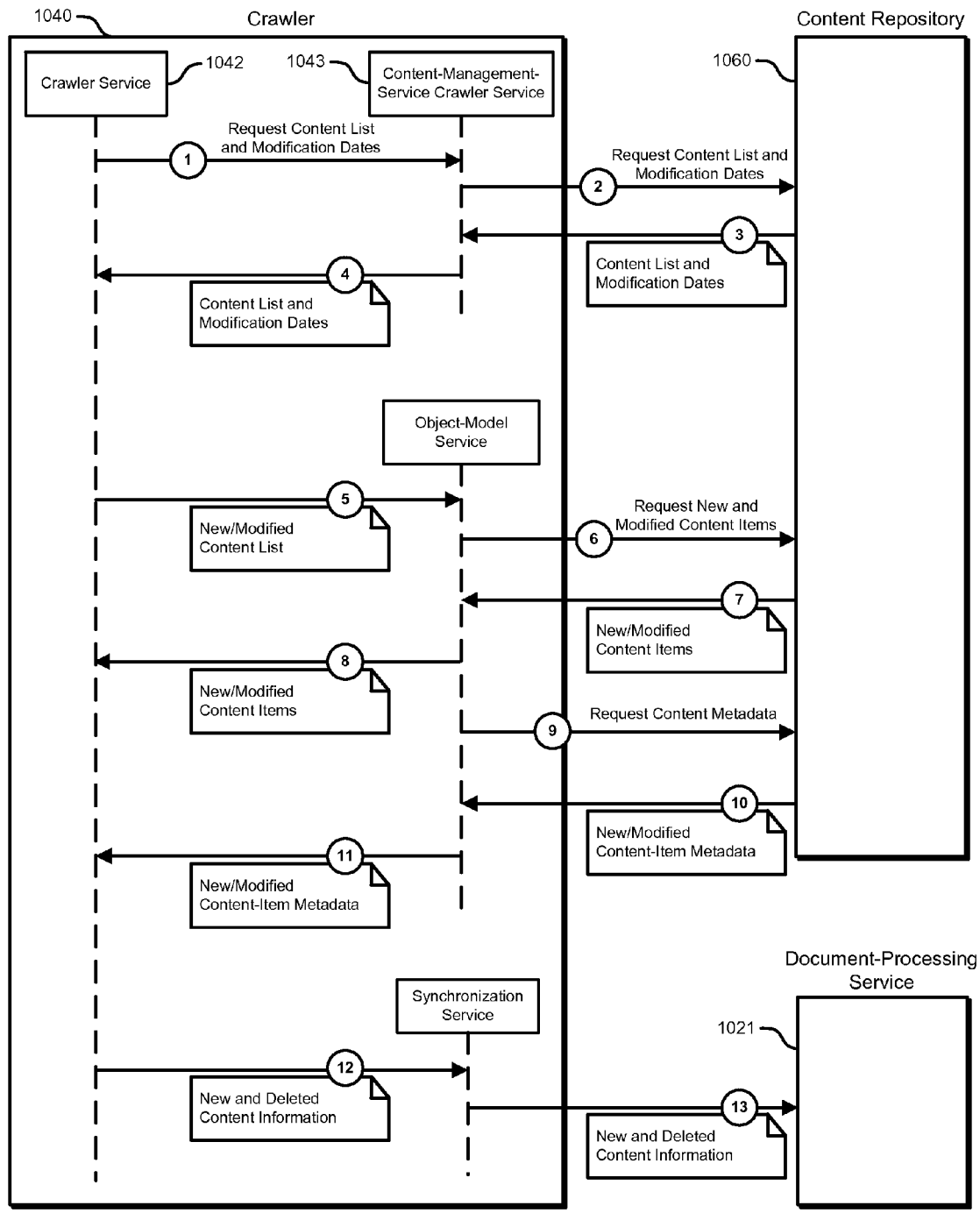
FIG. 10 illustrates an example embodiment of an operational flow in a context-management system.

FIG. 10 illustrates an example embodiment of an operational flow in a context-management system. In stage 1, a crawler service 1042, which is operated by crawler 1040, sends a request to fetch a content list, which is a list of content items, and the modification dates of the content items to a content-management-service crawler service 1043. In stage 2, the content-management-service crawler service 1043 sends the request for the content list and the modification dates to a content repository 1060 (e.g., a content-management service, a shared folder, an enterprise file server, a network drive). Then in stage 3, the content repository 1060 returns the content list and the modification dates of the content items that are identified by the content list to the content-management-service crawler service 1043, which, in stage 4, then sends the content list and the modification dates (e.g., day, time) to the crawler service 1042. The crawler service 1042 generates a list of new and modified content items based on the content list, the modification dates, and the previous crawl date of the content repository 1060. Then, in stage 5, the crawler service 1042 sends the list of new and modified content items to the object-model service.

In stage 6, the object-model service sends a request for the new and modified content items to the content repository 1060. Next, in stage 7, the object-model service obtains the new and modified content items from the content repository 1060. Following, in stage 8, the object-model service sends the new and modified content items to the crawler service 1042. In stage 9, the object-service model sends a request for the metadata of the new and modified content items to the content repository 1060, which sends the metadata of the new and modified content items to the object-model service in stage 10. Then in stage 11, the object-model service sends the metadata of the new and modified content items to the crawler service 1042.

In stage 12, the crawler service 1042 sends new and deleted content information to a synchronization service. The new and deleted content information may include new content items, may include metadata of the new content items, may include modified content items, may include metadata of the modified content items, and may identify deleted content items. Finally, in stage 13, the synchronization service sends the new and deleted content information to a document-processing service 1021. The document-processing service 1021 updates an index or a data warehouse based on the new and deleted content information. For example, the document-processing service 1021 may delete information in the index that corresponds to deleted content items and may add information to the index that corresponds to new content items or modified content items.

Figure 11:
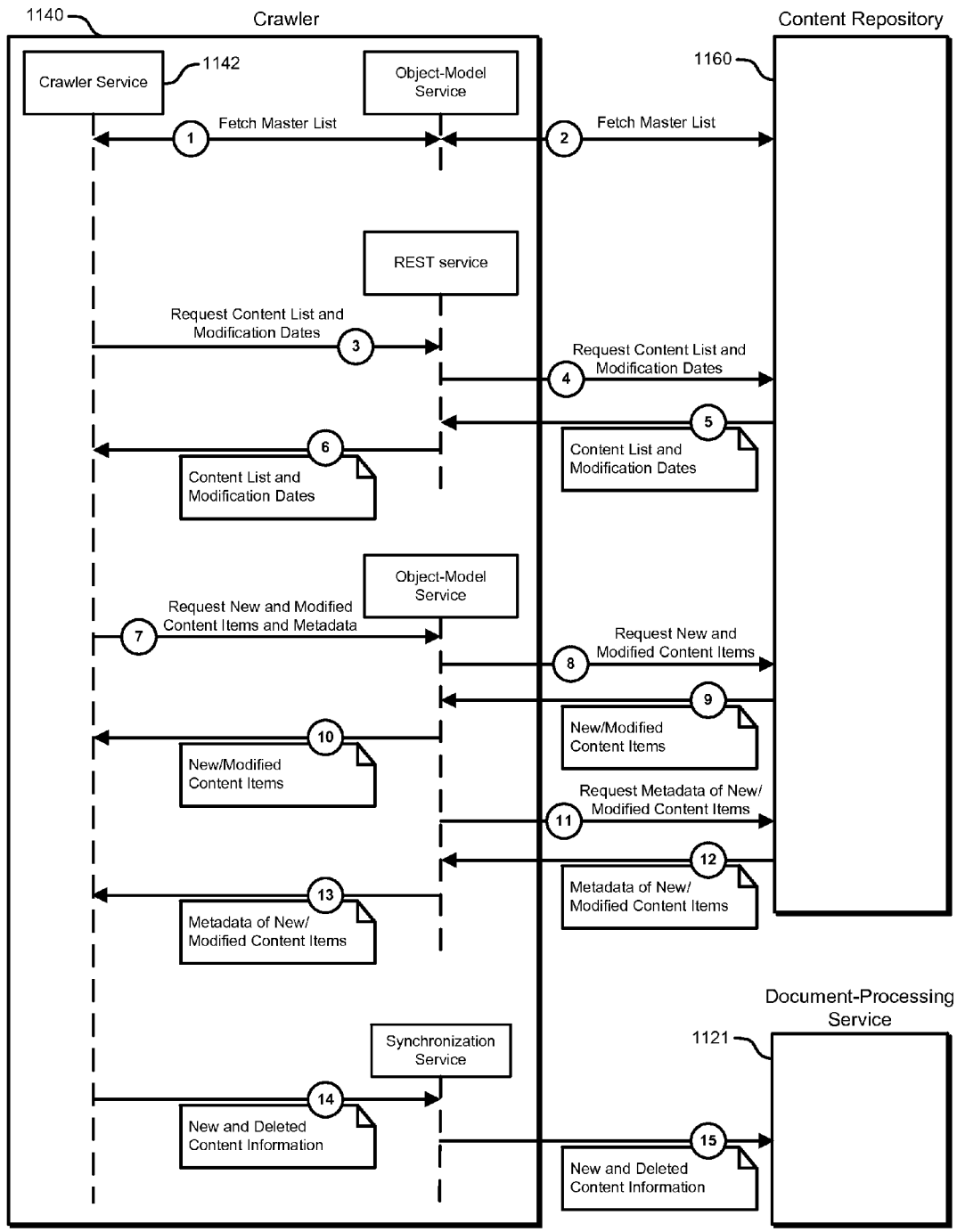
FIG. 11 illustrates an example embodiment of an operational flow in a context-management system.

FIG. 11 illustrates an example embodiment of an operational flow in a context-management system. In stage 1, a crawler service 1142, which is operated by a crawler 1140, sends a request for a master list, which identifies all of the content items that are stored in the content repository 1160 and their storage locations, to an object-model service. In stage 2, the object-model service obtains the master list from the content repository 1160 and sends the master list to the crawler service 1142. The crawler service 1142 determines the content lists and the respective content repositories 1160 that store the content items in the content lists based on the master list. In stage 3, the crawler service 1142 sends a request for a content repository's (e.g., the content repository 1160) content list and the modification dates of the content items in the content list to a REST service. In stage 4, the REST service sends a request for the content list and the modification dates of the content items in the content list to the respective content repository 1160, and in stage 5 the content repository 1160 sends the content list and the modification dates to the REST service. Next, in stage 6, the REST service sends the content list and the modification dates to the crawler service 1142.

The crawler service 1142 then determines which content items in the content list are new or have been modified, and in stage 7 sends a request to the object-model service for the new and modified content items and the metadata of the new and modified content items. Following, in stage 8, the object-model service sends a request for the new and modified content items to the content repository 1160, which sends the new and modified content items to the object-model service in stage 9. The object-model service sends the new and modified content items to the crawler service 1142 in stage 10.

Next, in stage 11, the object-model service sends a request for the metadata of the new and modified content items to the content repository 1160. In stage 12, the content repository 1160 sends the metadata of the new and modified content items to the object-model service, and in stage 13 the object-model service sends the metadata of the new and modified content items to the crawler service 1142. In stage 14, the crawler service 1142 sends new and deleted content information to a synchronization service. Finally, in stage 15, the synchronization service sends the new and deleted content information to a document-processing service 1121, which updates an index or data warehouse based on the new and deleted content information.

Figure 12:
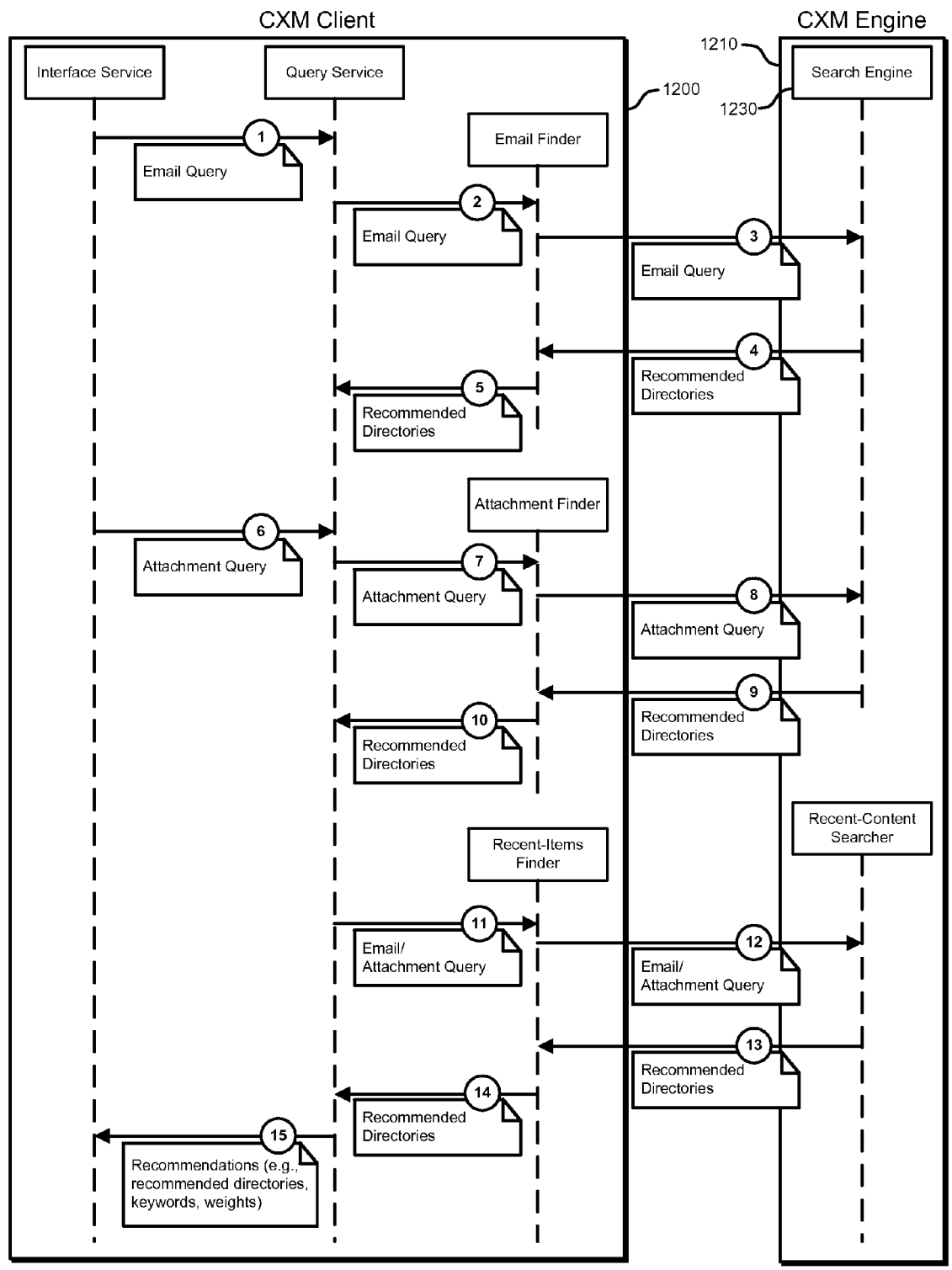
FIG. 12 illustrates an example embodiment of an operational flow in a context-management system.

FIG. 12 illustrates an example embodiment of an operational flow in a context-management system. In stage 1, an interface service that is operated by a CXM client 1200 sends an email query (a query that is based on an email) to a query service of the CXM client 1200. The interface service may be, for example, a plug-in to a web browser or to an email application. The query service determines that the query is an email query and sends the email query to an email finder in stage 2. Next, in stage 3, the email finder sends the email query to a search engine 1230 that is operated by a CXM engine 1210. In this example embodiment, the recommendations that the search engine 1230 searches for are directories (or other storage locations, such as folders), and the search engine 1230 searches for directories that are related to the email query. Then in stage 4, the search engine 1230 sends the recommended directories (and the keywords, in some embodiments) to the email finder. The email finder then sends the recommended directories to the query service in stage 5.

Also, in stage 6 the interface service sends an attachment query (a query that is based on an attachment of an email) to the query service. In stage 7, the query service sends the attachment query to the attachment finder, which then sends the attachment query to the search engine 1230 in stage 8. The search engine 1230 then searches for directories (or other storage locations) that are related to the attachment query, and the search engine 1230 sends the recommended directories to the attachment finder in stage 9. In stage 10, the attachment finder sends the recommended directories to the query service.

Additionally, this embodiment includes a dedicated recent-items finder, which looks for content items that have been recently added to a document repository. The CXM engine 1210 may include a dedicated metadata cache that stores information about content items that have been recently added to a data warehouse. In stage 11, the query service sends a query that is a combination of the email query and the attachment query to a recent-items finder. The recent-items finder sends the combined query to a recent-content searcher that is operated by the CXM engine 1210. The recent-content searcher searches a metadata cache and other records of recently-accessed directories and recently-added content items for directory recommendations that are related to the combined query. Next, in stage 13, the recent-content searcher sends the recommended directories to the recent-items finder. In some embodiments, the recent-items finder also searches a local file system on the computing device that operates the CXM client 1200 for recently-accessed documents, recently-accessed directories, or other content items. For example, some operating systems maintain a list of links to recently-accessed documents and recently-accessed directories, and the recent-items finder can use the list of links to search for recently-accessed documents, directories, and other content items. The recent-items finder sends the recommended directories to the query service in stage 14. The query service then aggregates the recommended directories that it received in stages 5, 10, and 14, and, in stage 15, the query service sends the aggregated recommendations to the interface service. The aggregated recommendations may include the recommended directories, keywords, weights that were assigned to the keywords, etc. Additionally, the query service may sort and filter the recommended directories that it received in stages 5, 10, and 14, before sending the recommended directories to the interface service.

Figure 13:
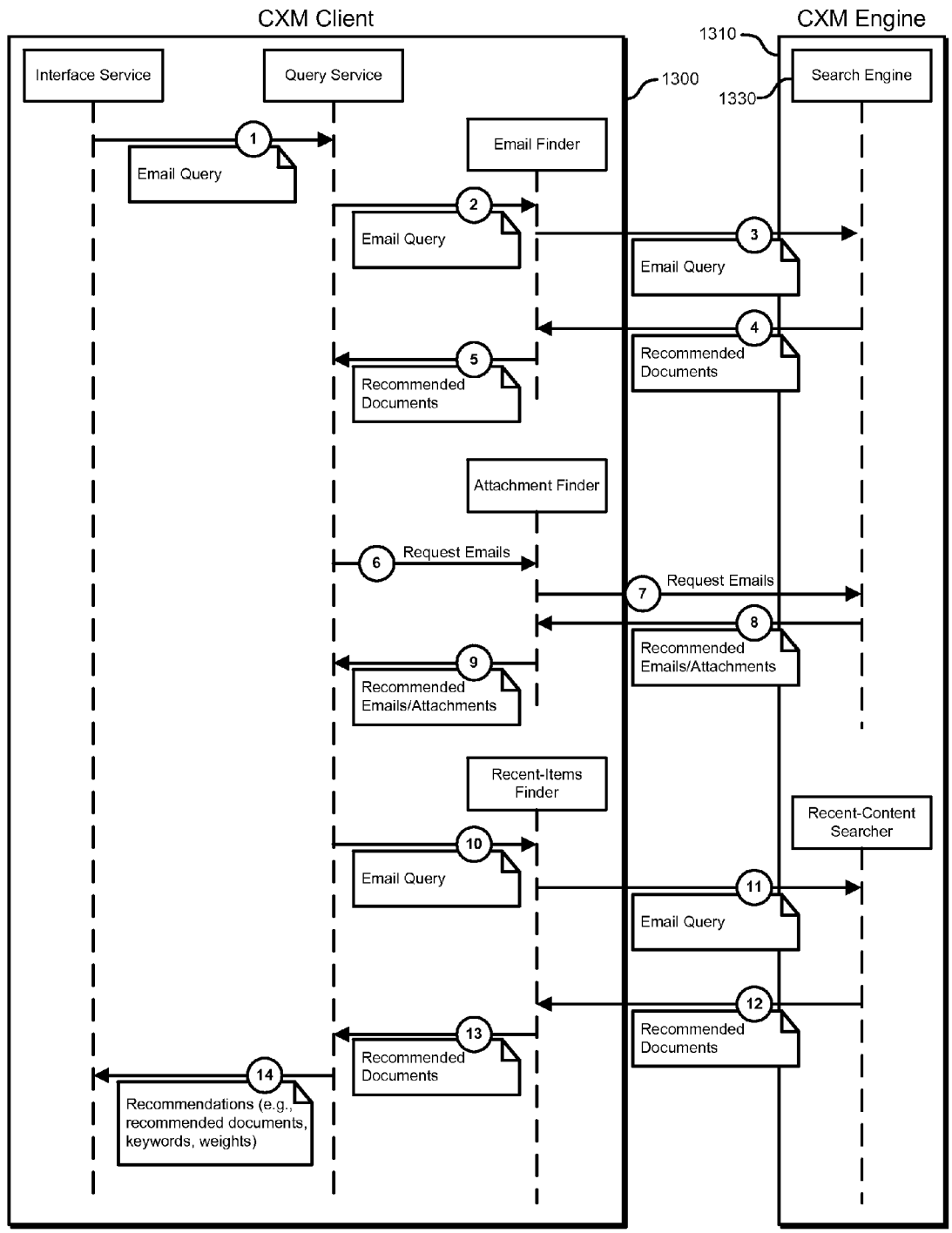
FIG. 13 illustrates an example embodiment of an operational flow in a context-management system.

FIG. 13 illustrates an example embodiment of an operational flow in a context-management system. In stage 1, an interface service, which is operated by a CXM client 1300, sends an email query to a query service, and in stage 2, the query service sends the email query to an email finder. Next, in stage 3, the email finder sends the email query to a search engine 1330 that is operated by a CXM engine 1310. In this embodiment, the search engine 1330 searches for recommended documents, such as .txt files, .rtf files, .pdf files, .doc files, .docx files, .xls files, .xlsx files, .xps files, .xml files, .html files, .ppt files, .pptx files, .odp files, and .odf files. Although this embodiment uses documents, other embodiment may use other types of content. In stage 4, the search engine 1330 returns the recommended documents to the email finder. Following, in stage 5, the email finder sends the recommended documents to the query service.

Also, this embodiment includes a dedicated attachment finder that initiates searches for emails and their attachments. Some embodiments may include other dedicated finders, which may search for a particular type of content (e.g., documents, images, audio files, videos) or may search for content items that satisfy another criterion or other criteria. In stage 6, the query service sends a request for emails to the attachment finder, and in stage 7 the attachment finder sends the request for emails to the search engine 1330. Next, the search engine 1330 searches for recommended emails and attachments, and, in stage 8, the search engine 1330 sends the recommended emails and attachments to the attachment finder. In stage 9, the attachment finder sends the recommended emails and attachments to the query service.

Additionally, this embodiment includes a recent-items finder, which searches for content items that have been created, accessed, or modified within a specified amount of time (e.g., an hour, a day, a week). In stage 10, the query service sends an email query to the recent-items finder. In stage 11, the recent-items finder sends the email query to a recent-content searcher, which searches a metadata cache for recommended documents. In stage 12, the recent-content searcher sends the recommended documents to the recent-items finder, which sends the recommended documents to the query service in stage 13. The query service performs one or more of aggregating, filtering, and sorting the recommended documents that were received in stage 5, the recommended emails and attachments that were received in stage 9, and the recommended documents that were received in stage 13. Finally, the query service sends the recommendations (e.g., the recommended documents, keywords) and, in some embodiments, other information about the recommendations (e.g., weights of the keywords) to the interface service.

Figure 14:
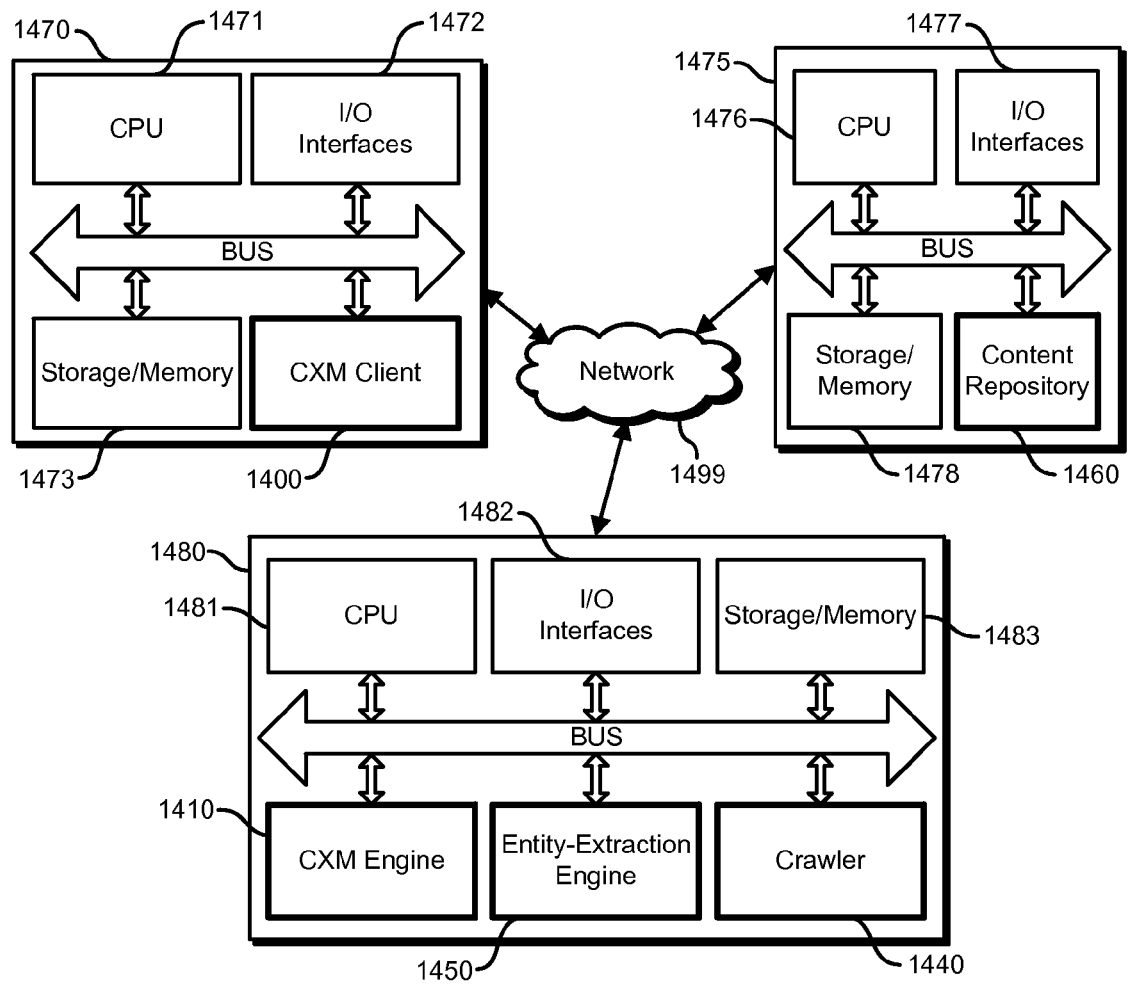
FIG. 14 illustrates an example embodiment of a context-management system.

FIG. 14 illustrates an example embodiment of a context-management system. The system includes a client device 1470, a content-storage device 1475, and a context-management device 1480. These devices communicate via one or more networks 1499, which may include, for example, LANs, MANs, IANs, WANs, and the Internet. The client device 1470 includes one or more processors (CPU) 1471, one or more I/O interfaces 1472, and storage/memory 1473. The CPU 1471 includes one or more central processing units, which include microprocessors (e.g., a single core microprocessor, a multi-core microprocessor) or other circuits, and the CPU 1471 is configured to read and perform computer-executable instructions, such as instructions that are stored in storage or in memory (e.g., in modules that are stored in storage or memory). The computer-executable instructions may include instructions for performing the operations described herein. The I/O interfaces 1472 include communication interfaces to input and output devices, which may include a keyboard, a display, a mouse, a printing device, a touch screen, a light pen, an optical-storage device, a scanner, a microphone, a camera, a drive, and a network (either wired or wireless).

The storage/memory 1473 includes one or more computer-readable or computer-writable media, for example a computer-readable storage medium. A computer-readable storage medium, in contrast to a mere transitory, propagating signal, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 1473 is configured to store computer-readable data, computer-executable instructions, or both. The components of the client device 1470 communicate via a bus. Also, the client device 1470 includes a CXM client 1400.

The content-storage device 1475 includes one or more CPUs 1476, one or more I/O interfaces 1477, and storage/memory 1478. The content-storage device 1480 also includes a content repository 1460. Additionally, the context-management device 1480 includes one or more CPUs 1481, I/O interfaces 1482, and storage/memory 1483. Finally, the content storage device 1480 also includes a CXM engine 1410, an entity-extraction engine 1450, and a crawler 1440.

Furthermore, in some embodiments, the client device 1470 also operates one or more of a crawler 1440, a content-repository 1460, and a CXM engine 1410. These embodiments may be able to more quickly generate recommendations that are based on content items that are stored on the client device 1470.

Figure 15:
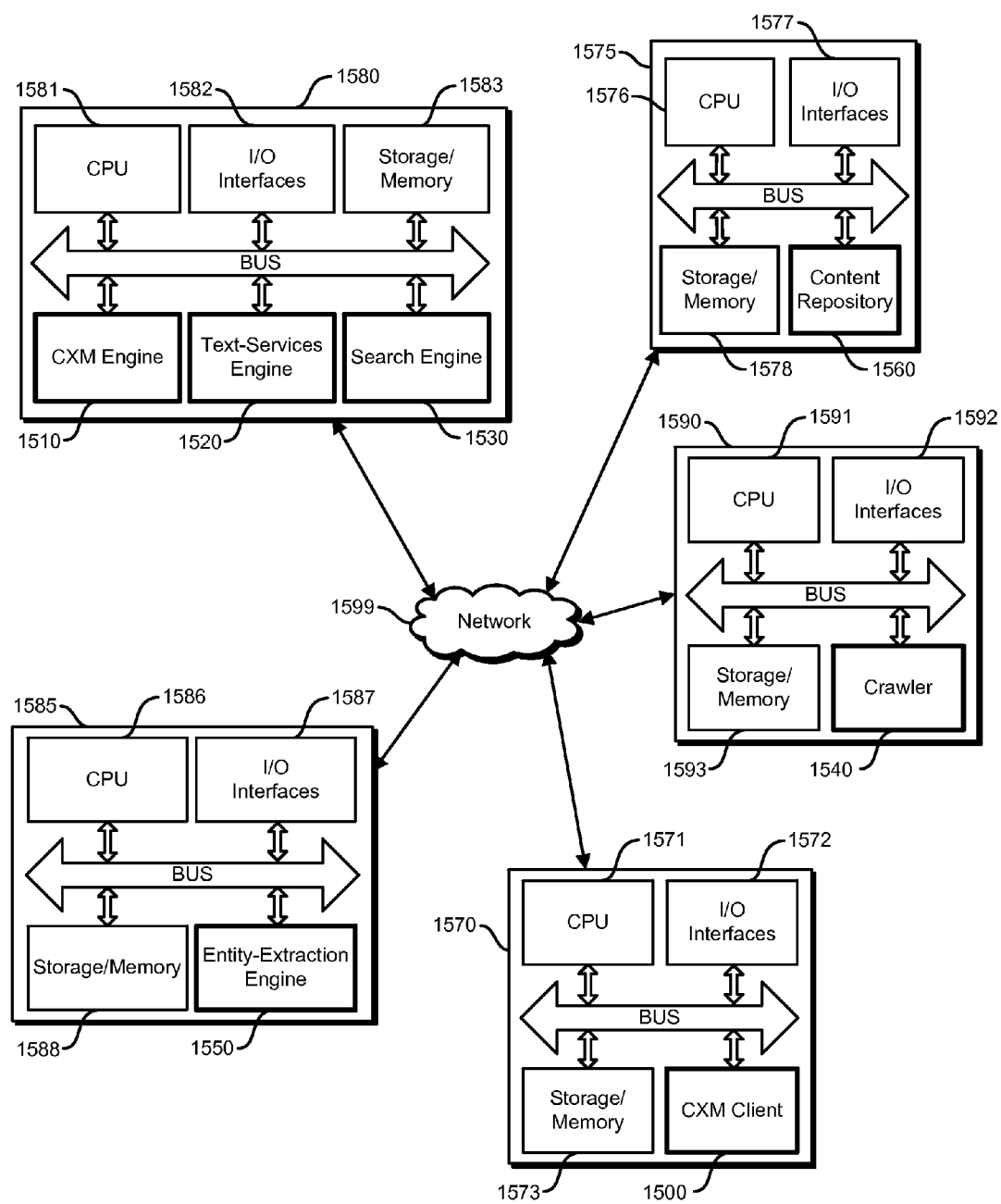
FIG. 15 illustrates an example embodiment of a context-management system.

FIG. 15 illustrates an example embodiment of a context-management system. The system includes a client device 1570, a content-storage device 1575, a context-management device 1580, and entity-extraction device 1585, and a crawler device 1590. These devices communicate via one or more networks 1599. The client device 1570 includes one or more CPUs 1571, one or more I/O interfaces 1572, and storage/memory 1573, and the client device 1570 includes a CXM client 1500. The content-storage device 1575 includes one or more CPUs 1576, one or more I/O interfaces 1577, storage/memory 1578, and a content repository 1560. The context-management device 1580 includes one or more CPUs 1581, one or more I/O interfaces 1582, and storage/memory 1583. Also, the context-management device 1580 includes a CXM engine 1510, a text-services engine 1520, and a search engine 1530. The entity-extraction device 1585 includes one or more CPUs 1586, one or more I/O interfaces 1587, and storage/memory 1588, and the entity-extraction device 1585 also includes an entity-extraction engine 1550. Finally, the crawler device 1590 includes one or more CPUs 1591, one or more I/O interfaces 1592, and storage/memory 1593, and the crawler device 1590 also includes a crawler 1540.

Figure 16:
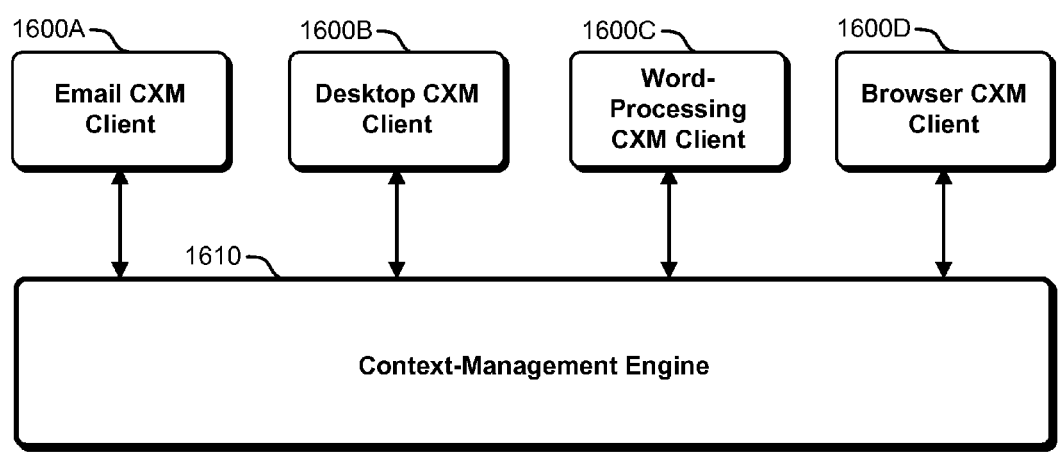
FIG. 16 illustrates an example embodiment of a context-management system.

FIG. 16 illustrates an example embodiment of a context-management system. The system includes a CXM engine 1610 and four CXM clients 1600. The CXM clients 1600 are each specialized for a certain computing environment. The Email CXM client 1600A generates recommendations for an email application. The desktop CXM client 1600B generates recommendations in a desktop environment, for example when using a user interface that displays the content items of the computing device that operates the interface. The word-processing CXM client 1600C generates recommendations for a word-processing application. Finally, the browser CXM client 1600D generates recommendations for a web browser. Other embodiments of the system may include other specialized clients.

Figure 17:
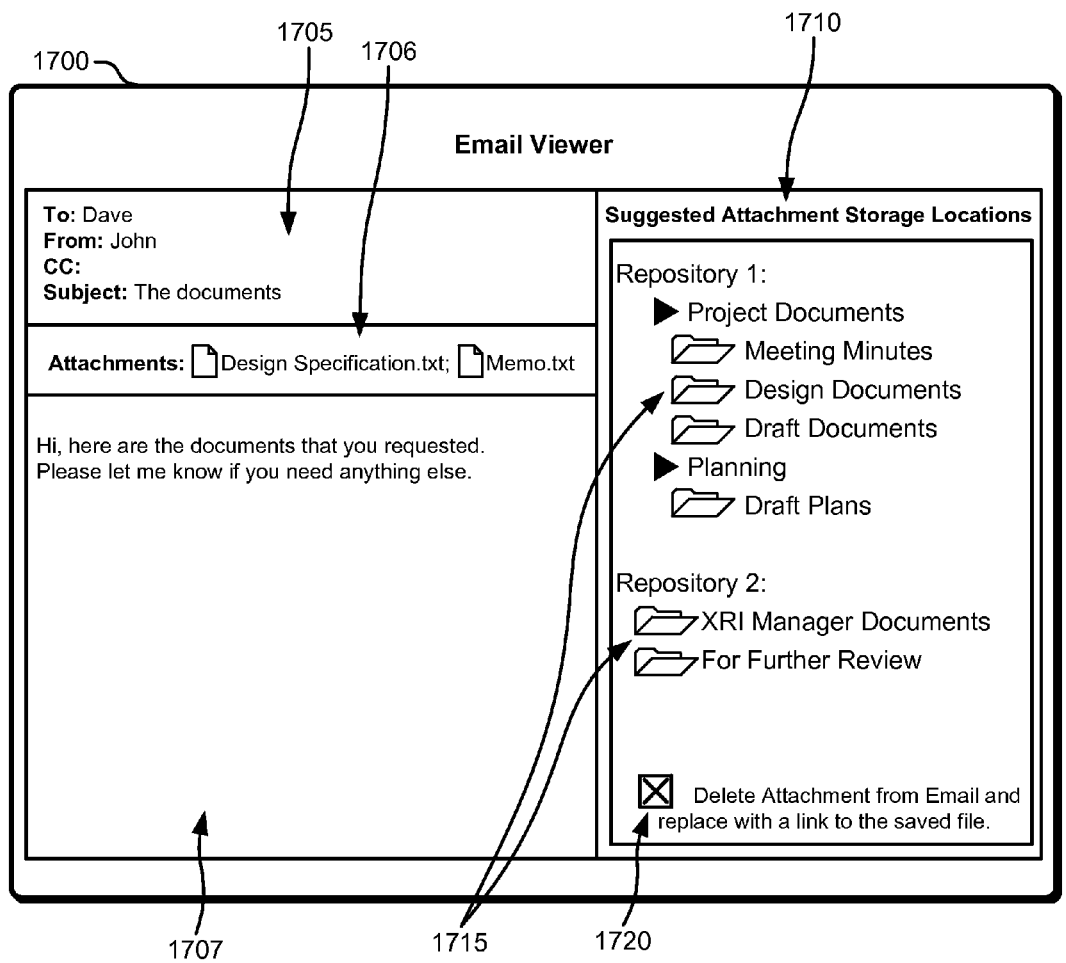
FIG. 17 illustrates an example embodiment of a user interface for a context-management system.

FIG. 17 illustrates an example embodiment of a user interface 1700 for a context-management system. The user interface 1700 includes an email-header area 1705, an attachment area 1706, and a message area 1707. The user interface also includes a suggestion area 1710, which displays icons 1715 for recommended storage locations for the attachments that are listed in the attachment area 1706. When a client device opens an email message and displays the message in the user interface 1700, a CXM client, which may be a plug-in for the email client, sends a query to a CXM engine. The query includes the names of the attachments, and may include other information, such as the name of the sender, the names of any recipients, the title of the email, and the body of the email. Furthermore, the query may also include information from other services or applications on the client device, such as the names of any other files that are currently open, a list of recently opened files, a list of recently-accessed storage locations, and a list of other applications that are currently running on the client device. Also, the query may include a request for storage locations.

The CXM engine receives the query and generates recommendations based on the query. The CXM engine then sends the recommendations, which are storage locations in this example, to the CXM client. The CXM client then adds the recommended storage locations to the suggestion area 1710. The user interface 1700 may allow a user to store an attachment in a recommended storage location, for example by "dragging" an icon of the attachment to the icon 1715 of the recommended storage location, or by tapping or clicking on the icon 1715 of the recommended storage location.

Additionally, the user interface 1700 includes a control 1720 that allows a user to command the client device to delete an attachment from the email and replace the attachment with a link to the storage location when the client device stores the attachment in the storage location. For example, if the control 1720 is activated and a user drags the icon for the attachment Memo.txt over the icon 1715 for Draft Documents, then the client device stores Memo.txt in Draft Documents, deletes Memo.txt from the email, and adds a link to Memo.txt to the email. Replacing the attachment with a link to the attachment may help reduce the space required to store emails.

Figure 18:
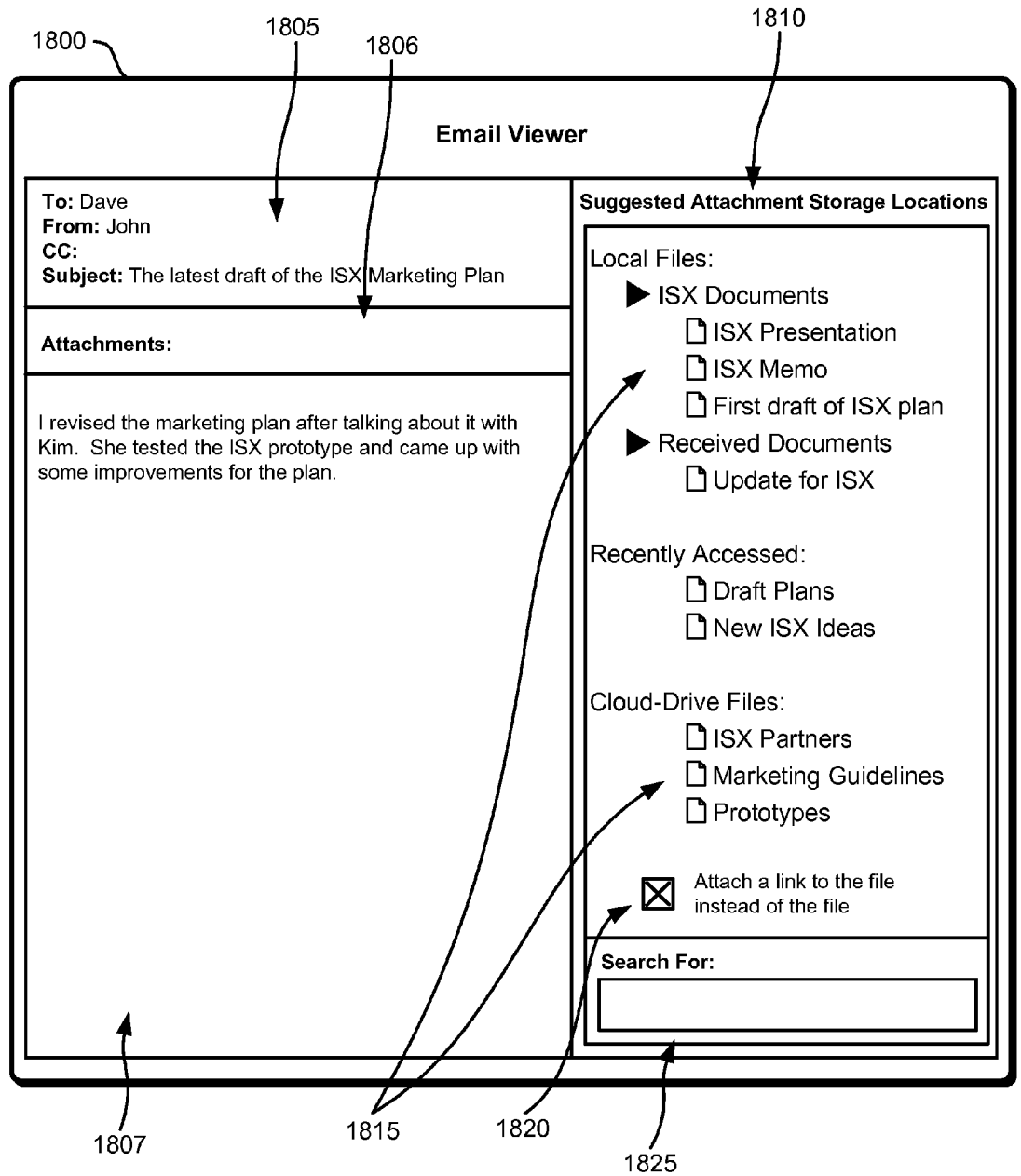
FIG. 18 illustrates an example embodiment of a user interface for a context-management system.

FIG. 18 illustrates an example embodiment of a user interface 1800 for a context-management system. The user interface 1800 includes an email-header area 1805, an attachment area 1806, and a message area 1807. The user interface also includes a suggestion area 1810, which displays icons 1815 for recommended content items that are based on the contents of and context of an email message (which is an example of a content item). When a client device opens a new email message and a user starts adding information to the email, a CXM client, which may be a plug-in for the email client, sends a query to a CXM engine. The query includes at least some of the information that has been added to the email, for example the name of the sender, the names of any recipients, the title of the email, the body of the email, a list of any attachments to the email, and at least some of the contents of the attachments. Furthermore, the query may also include information from other services or applications on the client device, such as the names of any other files that are currently open, a list of recently opened files, a list of recently-accessed storage locations, and a list of other applications that are currently running on the client device. Also, the query may include a specific request for documents.

The CXM engine receives the query and generates recommendations based on the query. The CXM engine then sends the recommendations, which are documents in this example, to the CXM client. The CXM client then adds the recommended storage locations to the suggestion area. The user interface 1800 may allow a user to add an attachment to the email, for example by "dragging" an icon 1815 of a recommended document to the attachment area 1806, or by tapping or clicking on the icon 1815 of the recommended document.

Additionally, the user interface 1800 includes a control 1820 that allows a user to command the client device to attach a link to a selected document instead of attaching the document itself. For example, if the control 1820 is activated and a user selects the icon 1815 for the attachment Marketing Guidelines, the client device adds a link to Marketing Guidelines to the email and displays a notification of the attachment in the attachment area 1806. Furthermore, the user interface includes a search area 1825, which allows a user to command the client device to search the recommended documents for documents that satisfy certain criteria (e.g., document name, file format, modification date, and file size) that are entered into the search area 1825.

FIG. 19A and FIG. 19B illustrate example embodiments of context profiles of a user. FIG. 19A shows a context profile for a user (i.e., user ABC). The context profile includes information about the user's job, applications that are open on the user's computing device, and files that the user has recently accessed. Some embodiments may include other context information in addition to or in alternative to the context information shown in these examples. For example, some embodiments may include recently-accessed directories, security privileges, recently-closed applications, coworker names, searches, recent meetings, a current meeting, recent emails, recent collaborations, a date and time, previous projects that the user has worked on, skills of the user, interests of the user, or past activities of the user.

FIG. 19B illustrates a change in the context profile information that is made in response to the user's activities. If the user closes the word-processing application and opens a video-playing application to watch a video that is named "AL-189 Flux Capacitor Video," then the "Applications" section is modified by removing the word-processing application and adding the video-playing application. Also, the "Recently-Accessed Files" section is modified to add "AL-189 Flux Capacitor Video." Thus, the context profile may be regularly updated, which may improve the relevancy of recommendations that are generated based, at least in part, on the context profile. In some embodiments, the information in the sections is organized according to rankings. For example, the "Application" section may be sorted in ascending order based on how often the applications are used or on which applications are currently in use. Thus, in some embodiments, when the word-processing application is closed and the video-playing application is opened, the word-processing application is moved lower in the list than the video-playing application, although both are shown in the "Applications" section.

FIG. 20A and FIG. 20B illustrate example embodiments of context profiles of content items. The content item in FIG. 20A is a text document, and the context profile includes some of the context information about the text document. For example, the context profile indicates the author of the document, the date that the document was last viewed, the size of the file, and the project that is associated with the document. The content item in FIG. 20B is an image. The context profile includes context information about the image, such as the author, the date when the image was last viewed, and tags.

The above-described devices, systems, and methods can be implemented by providing one or more computer-readable media that contain computer-executable instructions for realizing the above-described operations to one or more computing devices that are configured to read and execute the computer-executable instructions. Thus, the systems or devices perform the operations of the above-described embodiments when executing the computer-executable instructions. Also, an operating system on the one or more systems or devices may implement at least some of the operations of the above-described embodiments. Thus, the computer-executable instructions or the one or more computer-readable media that contain the computer-executable instructions constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method for contextual management, the method comprising:
performing a first process repeatedly, wherein the first process includes:
(i) extracting content information corresponding to a new or modified content item from a collection of digital content items to be distributed in a plurality of locations on a network,
(ii) normalizing the new or modified content item corresponding to the extracted content information,
(iii) sending the normalized content item to a data warehouse, which is a local storage for managing a normalized content item, and
(iv) registering keywords extracted from the new or modified content item to the data warehouse;
performing a second process repeatedly, wherein the second process includes:
(i) examining a new content item of the data warehouse,
(ii) generating an index from content information of the new content item, and
(iii) updating an index database using the generated index,
receiving a query from a computing device, wherein the query is automatically generated by a client program of the computing device in response to a user's operations for an application;
determining a context of the user associated with the received query;
generating an enhanced query by using a registered keyword corresponding to the contents of the query according to the reception of the query;
performing a search based on the context of the user and contents of the enhanced query generated by using the registered keyword;
generating a recommendation according to a result of the search and an index in the index database; and
returning the generated recommendation to the client program of the computing device.

2. The method of claim 1, wherein the recommendation is a storage location.

3. The method of claim 1, wherein the recommendation is a file.

4. The method of claim 1, wherein the query is based on context information or content information that was extracted from at least one of user information included in an email, title information included in the email, information in a body of the email, and an attachment of the email.

5. The method of claim 4, wherein the generated recommendation indicates, as storage candidates of the attachment of the email, storage locations corresponding to the context of the user and the contents of the query.

6. The method of claim 4, wherein the generated recommendation indicates, as candidates for an attachment to the email, files corresponding to the context of the user and the contents of the query.

7. The method of claim 1, wherein the collection of digital content items is stored on a plurality of computing devices in an enterprise.

8. The method of claim 1, wherein the context of the user includes a context of a user's activity.

9. The method of claim 1, further comprising:
filtering the generated recommendation based on access permissions of the received query.

10. A system for contextual management, the system comprising:
one or more computer-readable media;
one or more input/output interfaces; and one or more processors that are configured to cause the system to
  perform a first process repeatedly, wherein the first process includes:
    (i) extracting content information corresponding to a new or modified content item from a collection of digital content items,
    (ii) normalizing the new or modified content item corresponding to the extracted content information,
    (iii) sending the normalized content item to a data warehouse, which is a local storage for managing a normalized content item, and
    (iv) registering keywords extracted from the new or modified content item to the data warehouse;
  perform a second process repeatedly, wherein the second process includes:
    (i) examining a new content item of the data warehouse,
    (ii) generating an index from content information of the new content item, and
    (iii) updating an index database using the generated index;
  receive a query from a computing device, wherein the query is automatically generated by a client program of the computing device in response to a user's operations for an application;
  determine a context of the user associated with the received query;
  generate an enhanced query by using a registered keyword corresponding to the contents of the query according to the reception of the query;
  perform a search based on the context of the user and contents of the enhanced query generated by using the registered keyword;
  generate a recommendation according to a result of the search and an index in the index database; and
  return the generated recommendation to the client program of the computing device.

11. The system of claim 10, wherein the one or more processors are further configured to cause the system to
  crawl a local file system on the computing device, wherein crawling includes identifying recently-accessed documents and directories;
  retrieve context information from recently-accessed document and directories; store retrieved context information in a cache; and
  generate the recommendation further according to the context information in the cache.

12. The system of claim 10, wherein the one or more processors are further configured to cause the system to
  crawl an enterprise storage location to identify newly-added content items, recently-accessed content items, or recently-revised content items; and
  generate the recommendation further according to the newly-added content items, the recently-accessed content items, or the recently-revised content items.

13. The system of claim 10, wherein the query is based on context information or content information that was extracted from at least one of user information included in an email, title information included in the email, information in a body of the email, and an attachment of the email.

14. The system of claim 10, wherein the generated recommendation indicates candidate storage locations corresponding to the context of the user and the contents of the enhanced query.

15. The system of claim 14, wherein the generated recommendation indicates candidate files corresponding to the context of the user and the contents of the enhanced query.

16. One or more computer-readable storage media storing instructions that, when executed by one or more computing devices, cause the one or more computing devices to perform operations comprising:
  performing a first process repeatedly, wherein the first process includes:
    (i) extracting content information corresponding to a new or modified content item from a collection of digital content items to be distributed in a plurality of locations on a network,
    (ii) normalizing the new or modified content item corresponding to the extracted content information,
    (iii) sending the normalized content item to a data warehouse, which is a local storage for managing a normalized content item, and
    (iv) registering keywords extracted from the new or modified content item to the data warehouse;
  performing a second process repeatedly, wherein the second process includes:
    (i) examining a new content item of the data warehouse,
    (ii) generating an index from content information of the new content item, and
    (iii) updating an index database using the generated index,
  receiving a query from computing device, wherein the query is automatically generated by a client program of the computing device in response to a user's operation of an application;
  determining a context of the user associated with the received query;
  generating an enhanced query by using a registered keyword corresponding to the contents of the query according to the reception of the query;
  performing a search based on the context of the user and contents of the enhanced query generated by using the registered keyword;
  generating a recommendation according to a result of the search and an index in the index database; and
  returning the generated recommendation to the client program of the computing device.

17. The one or more computer-readable storage media of claim 16, wherein the recommendation is a file, and
  wherein the operations further include determining if a recipient of an email can access the file, and
  adding a link to the file instead of adding the file to the email if the recipient can access the file or adding the file to the email if the recipient cannot access the file.

18. The one or more computer-readable storage media of claim 16, wherein the recommendation is a storage location, and
  wherein the operations further include
    storing an attachment to an email in the storage location, and
    replacing the attachment in the email with a link to the stored attachment.

19. The one or more computer-readable storage media of claim 16, wherein the operations further comprise
  extracting one or more keywords from the received query;
  adding the one or more keywords to a dictionary that includes a plurality of words, wherein the words in the dictionary are scored and sorted; and
  rescoring the words in the dictionary after adding the one or more keywords to the dictionary.

20. The one or more computer-readable storage media of claim 19, wherein the operations further comprise resorting the words in the dictionary after rescoring the words in the dictionary.

21. The one or more computer-readable storage media of claim 16,
wherein the recommendation includes a plurality of files, and
wherein the operations further comprise generating a graphical user interface that shows a list that includes respective names of the plurality of files.

* * * * *